United States Patent [19]
Mizutani et al.

[11] 4,189,212
[45] Feb. 19, 1980

[54] WIDE ANGLE ZOOM LENS SYSTEM

[75] Inventors: Norio Mizutani, Kawasaki; Soichi Nakamura, Kamakura, both of Japan

[73] Assignee: Nippon Kogaku K.K., Tokyo, Japan

[21] Appl. No.: 793,593

[22] Filed: May 4, 1977

[30] Foreign Application Priority Data

May 6, 1976 [JP] Japan ................................. 51/50792
Oct. 26, 1976 [JP] Japan ................................. 51/127766

[51] Int. Cl.² .......................................... G02B 15/16
[52] U.S. Cl. .................................................. 350/184
[58] Field of Search ................................ 350/184-187

[56] References Cited

U.S. PATENT DOCUMENTS 3,848,969  11/1974  Tajima ................................. 350/184

FOREIGN PATENT DOCUMENTS 2625058  12/1976  Fed. Rep. of Germany ........... 350/184
2640486   3/1977  Fed. Rep. of Germany ........... 350/184

Primary Examiner—Conrad J. Clark
Attorney, Agent, or Firm—Shapiro and Shapiro

[57] ABSTRACT

In a wide angle zoom lens system comprising a diverging lens group and a converging lens group which are both movable on the optical axis of the lens system to vary the air space between the two groups so that the magnification of the image is variable while the image plane is being maintained at a fixed position, the diverging lens group comprises, in order from the object side, a negative meniscus lens component convex to the object side, a positive lens component, a negative lens component, a positive meniscus lens component convex to the object side, the four lens components being separate from one another, and an air chamber having a converging effect being formed between the second and the third lens component, the third and the fourth lens component being so disposed that the air space therebetween is greater than the center thickness of the third member, and the converging lens group comprises at least four positive lens components a positive lens component out of which is closest to the object side and a positive lens component out of which is closest to the image side, and a negative lens component disposed among the at least four positive lens components, these five lens components being separate from one another.

22 Claims, 18 Drawing Figures

FIG. 12
SPHERICAL ABERRATION ——
DEVIATION FROM THE SINE CONDITION ----
ASTIGMATISM
DISTORTION
f=25.5
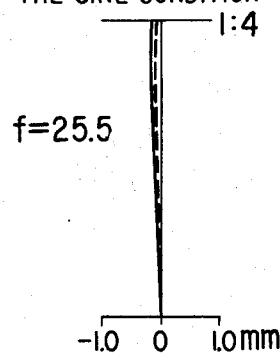
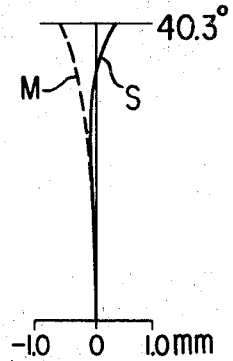
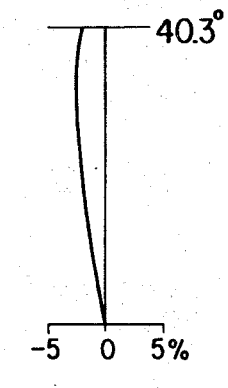
f=35.15
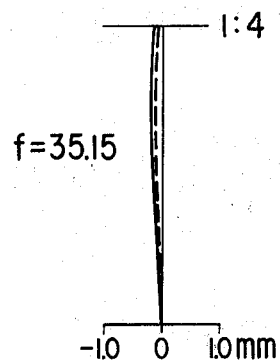
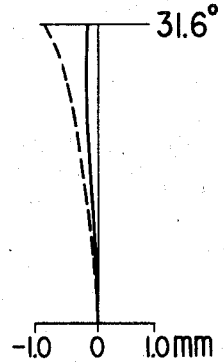
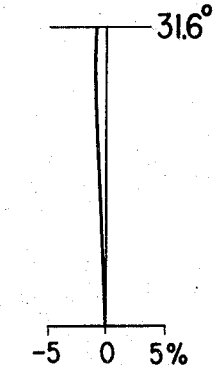
f=48.81
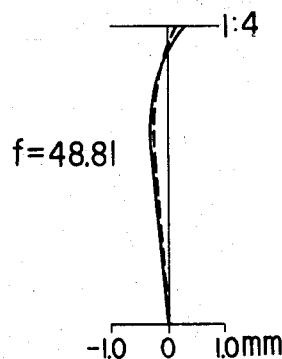
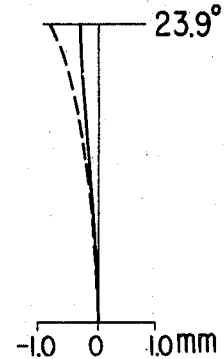
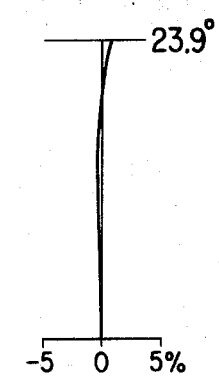

FIG. 14

SPHERICAL ABERRATION ———
DEVIATION FROM THE SINE CONDITION ----

ASTIGMATISM    DISTORTION f=25.041    1:4    40.8°    40.8°
M
S
−1.0  0  1.0mm    −1.0  0  1.0mm    −5  0  5% f=34.501    1:4    31.4°    31.4°
−1.0  0  1.0mm    −1.0  0  1.0mm    −5  0  5% f=44.539    1:4    24.4°    24.4°
−1.0  0  1.0mm    −1.0  0  1.0mm    −5  0  5%

FIG. 15

FIG. 16
SPHERICAL ABERRATION ——
DEVIATION FROM THE SINE CONDITION ----
ASTIGMATISM
DISTORTION
f=28.65
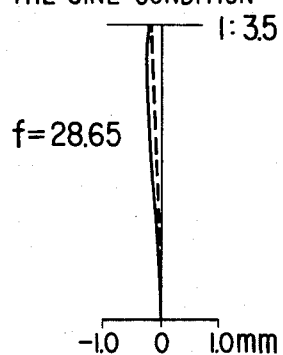 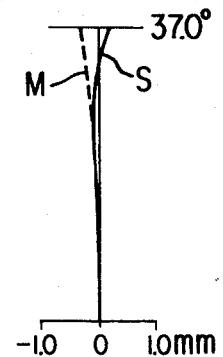 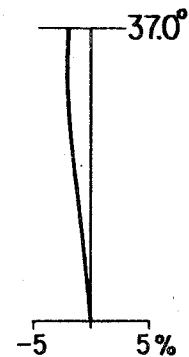
f=39.49
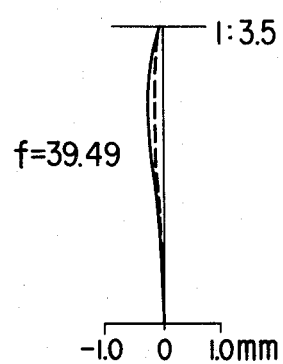 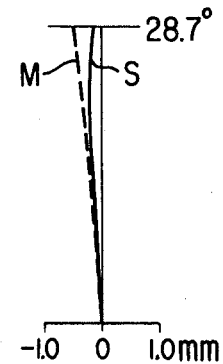 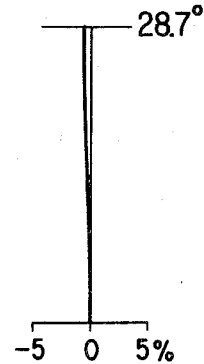
f=54.51
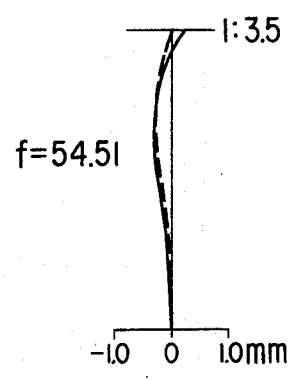 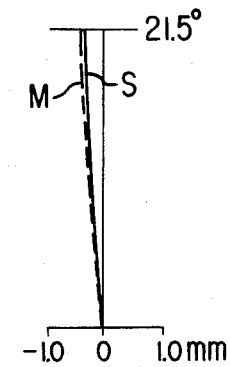 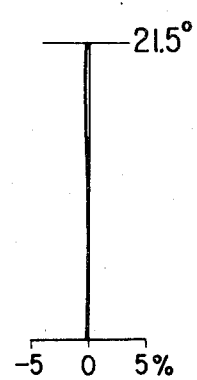

FIG. 18
SPHERICAL ABERRATION ——
DEVIATION FROM THE SINE CONDITION ----
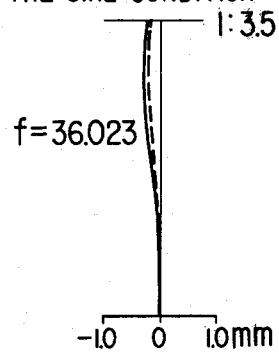
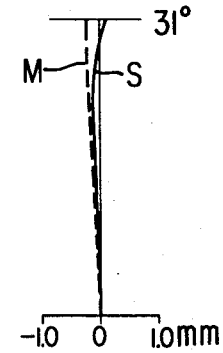
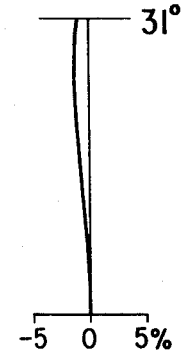
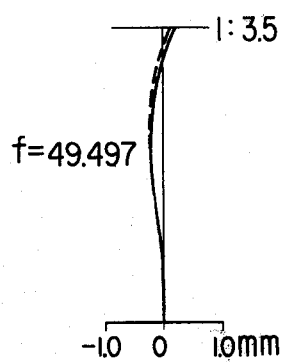
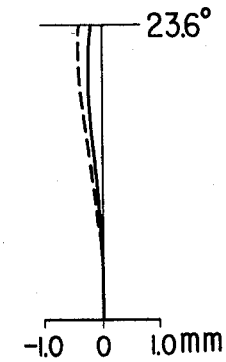
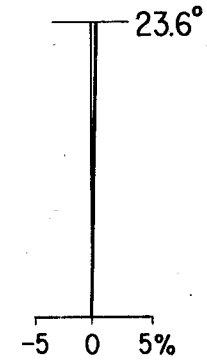
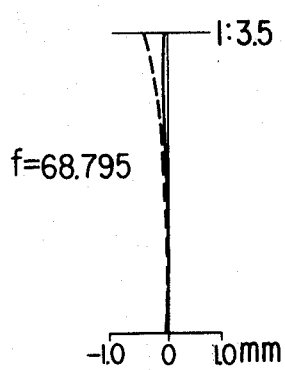
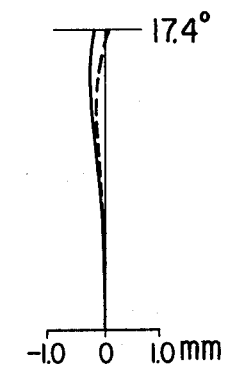
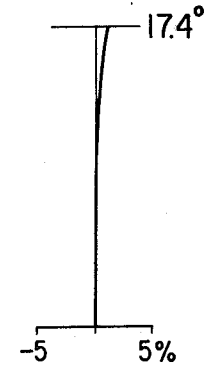

WIDE ANGLE ZOOM LENS SYSTEM

BACKGROUND OF THE INVENTION

1. Field of the Invention

This invention relates to a zoom lens system, and more particularly to a wide angle zoom lens system.

2. Description of the Prior Art

As a zoom lens system covering a wide angle of view, there is known a zoom lens system which comprises two forward and rearward lens groups, namely, a diverging lens group and a converging lens group, but such zoom lens system suffers from various difficulties still left to be generally overcome, such as the destruction of the balance of spherical aberration and coma attributable to the variation in focal length, the pronounced negative distortion at the short focal length side, the variation in distortion during the focal length condition at the opposite ends of zooming, the imbalance of the chromatic aberration of magnification attributable to the angle of view, the mismatching of the curvature of image plane attributable to chromatic difference, the difficulty encountered in reducing the size of the forward lens diameter to make the entire system more compact.

These difficulties come from the fact that the forward group is a diverging lens system, and some attempts to overcome these disadvantages have heretofore been made by the use of various diverging lens systems.

For example, as far as the distortion is concerned, success has been attained in reducing the distortion by using a positive meniscus lens, convex to the object side, as a first component forming the diverging lens system, but since the first component is a positive lens, oblique rays are intensely refracted by the first component and the rays emergent therefrom form greater angles with the optical axis and therefore, if the diaphragm position is regarded as being fixed, a greater angle of view requires the oblique rays entering the first component to pass through positions more distant from the optical axis and this has prevented the forward lens diameter from being sufficiently decreased.

There is also a zoom lens system in which the first component closest to the object side is comprised of a negative meniscus lens to thereby reduce the angles of deviation of oblique rays and correct the distortion, and this is considerably effective to achieve the purpose of reducing the forward lens diameter, but the residual distortion in such system exceeds −4% at the short focal length side having a half angle of view of the order of 31°, and this could not be sufficiently practical and has been considerably inferior to the fixed focus lens having a single focal length.

SUMMARY OF THE INVENTION

It is an object of the present invention to eliminate the above-noted disadvantages and to provide a zoom lens system in which various aberrations are corrected in a well-balanced manner while distortion is maintained at a level equivalent to that in a single focal length lens and in which the forward lens diameter is reduced to thereby make the entire system compact. It is a further object of the present invention to provide such a zoom lens system covering a wide angle of view and in which even a high degree of chromatic aberration is sufficiently corrected.

The lens system according to the present invention comprises two lens groups, namely, a diverging lens group forming the forward group and a converging lens group forming the rearward group, as viewed from the object side. The two lens groups are movable on the optical axis to vary the air space between the two groups and thereby change the magnification. The basic lens shape is such that the diverging lens group which is the forward group comprises, in order from the object side, a first member which is a negative meniscus lens component convex to the object side, a second member which is a positive lens component, a third member which is a negative lens component, and a fourth member which is a positive meniscus lens component convex to the object side, these four lens components being separate from one another, and an air chamber having a converging effect is formed between the second and the third member, and the third and fourth members are so disposed that the air chamber therebetween has a greater thickness than the center thickness of the third member. The converging lens group which is the rearward group comprises, in order from the object side, a fifth member which is a positive lens component, a sixth component which is a positive lens, a seventh member which is a positive meniscus lens component convex to the object side, an eighth member which is a negative lens component, and a ninth member which is a positive lens component, these five components being separate from one another.

The invention will become more fully apparent from the following detailed description thereof taken in conjunction with the accompanying drawings.

BRIEF DESCRIPTION OF THE DRAWINGS

FIGS. 10 to 18 are graphs illustrating various aberrations in Examples 1 to 9, respectively.

DESCRIPTION OF THE PREFERRED EMBODIMENTS

Figure 1:
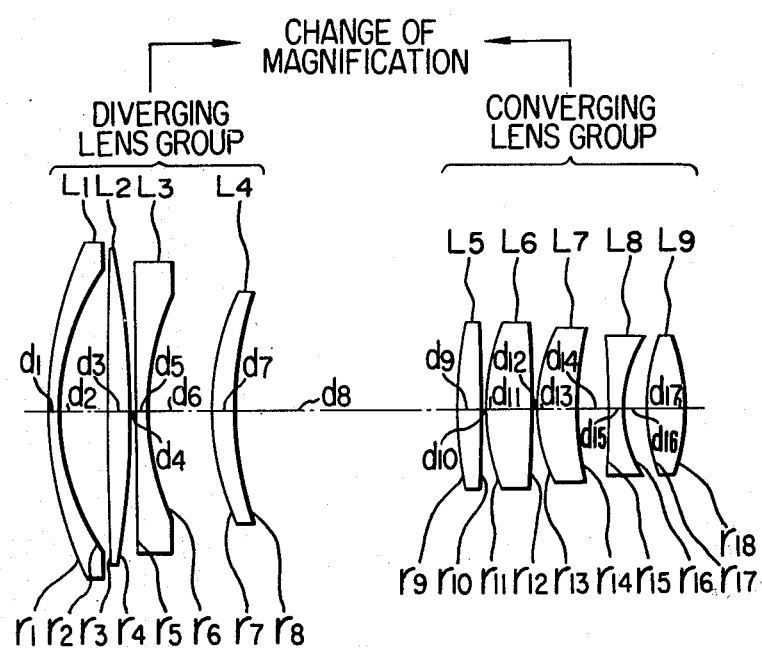
FIGS. 1 to 9 are cross-sectional views showing the lens arrangements according to Examples 1 to 9, respectively, of the present invention.

Significances of the arrangement of these lens components will hereinafter be described. In the type wherein a negative meniscus lens is disposed at that side of the diverging lens group which is closest to the object, correction of the negative distortion is difficult to do, as already noted, but according to the present invention, such negative distortion is overcome by the third member or the negative lens component $L_3$ satisfying the following condition to thereby form an air lens having a converging effect between the negative lens component $L_3$ and the second member or the positive lens component $L_2$:

$$0.5 < (R_5 + R_6)/(R_5 - R_6) < 1.2 \qquad (1),$$

where $R_5$ represents the curvature radius of the surface of the negative lens component of the third member which faces the object side, and $R_6$ the curvature radius of the surface of the same lens component which faces the image side. It has been found that if the lower limit is exceeded, the curvature radius of the concave surface with respect to the object side will be sharper so that the achromatizing effect between this negative lens component $L_3$ and the positive lens component $L_2$ disposed ahead thereof will be greater, while the negative distortion at the short focal length side of the lens system will be sharply aggravated. If the upper limit is exceeded, the curvature radius of the surface facing to the image side of the negative lens component $L_3$ will be too sharp and this will offer inconvenience to the correction of the spherical aberration at the long focal length side of the lens system. Therefore, this negative lens component $L_3$ must satisfy the foregoing condition. Also, the negative meniscus lens component of the first member $L_1$ and the negative lens component of the third member $L_3$ must satisfy the relation that $0.7 < |R_2|/|R_6| < 1.6$, where $R_2$ and $R_6$ represent the curvature radii of the successive surfaces, as viewed from the object side, of these two diverging lens components which face the image side, in order to perform the auxiliary role for reducing the distortion and to balance the other aberrations with one another. Especially, if this condition is departed from, it will become difficult to well correct the curvature of the image plane at the short focal length side of the lens system.

Further, if the air space D between the negative lens component of the third member $L_3$ and the positive meniscus lens of the fourth member $L_4$ is made greater than the center thickness of the third member $L_3$ and if the total focal length of the diverging lens group which is the forward group is $f_1$, the following condition must be satisfied to thicken such diverging lens group and correct the variations both in spherical aberration and curvature of image field resulting from the variation in the focal length:

$$0.1 \leq D/|f_1| \leq 0.4 \qquad (2)$$

If the lower limit of this condition is exceeded, it will be impossible to correct the variations both in spherical aberration and curvature of image field resulting from the variation in focal length and, if the upper limit of the condition is exceeded, the thickness of the diverging lens group will be too great so that the back principal plane of the diverging lens group will shift toward the object side, thus rendering it impossible to secure a zoom ratio. Also, if the focal length of the positive meniscus lens $L_4$ which is the fourth member of the diverging lens group is $f_{14}$, it has been found that a condition that $1.5|f_1| < f_{14} < 3.5|f_1|$ is useful to make the above condition (2) more effective and serves to play the auxiliary role for correcting the variations both in spherical aberration and curvature of image field. If the upper limit of this condition is exceeded, under-correction of the spherical aberration at the long focal length side will occur to bring about negative curvature of image field at the short focal length side. If the lower limit is exceeded, over-correction of the spherical aberration at the long focal length side will occur to bring about positive curvature of image field at the short focal length side.

In the basic construction of the diverging group as described above, it becomes possible to more sufficiently correct even the high degrees of chromatic aberration such as the imbalance of the chromatic aberration of magnification attributable to the angle of view and the mismatching of the curvature of image field attributable to the chromatic difference by selecting greater Abbe numbers of glass for the divergent components in the diverging group, namely, the first and the third member $L_1$, $L_3$, than the Abbe numbers of glass for the convergent components in the diverging group, namely, the second and the fourth member $L_2$, $L_4$ and the result is that a zoom lens having a wider angle of view can be provided. A more minute study has shown that if the Abbe numbers of glass for the negative meniscus lens component of the first member $L_1$ and the negative lens component of the third member $L_3$ are represented by $\nu$ and the Abbe numbers of glass for the positive lens component of the second member $L_2$ and the positive meniscus lens component of the fourth member $L_4$ are $\nu_2$ and $\nu_4$, respectively, satisfaction of the following two conditions is an effective means for correcting the high degrees of chromatic aberration.

$$\left. \begin{array}{l} \nu - \nu_4 > 10 \\ \nu > \nu_2 \end{array} \right\} \qquad (3)$$

It is already known that the converging lens group which is the rearward group is required to be of a great relative aperture due to the forward group being a diverging lens group, but when the zoom lens of this type is to be designed as compactly as possible, it is desirable that the forward principal plane be projected forwardly of the lens as in the telephoto type. When further compactness is desired, it is necessary to intensify the power both in the diverging lens group and the converging lens group and it is also necessary to correct the shift of the Petzval sum toward the negative direction resulting therefrom.

For the reasons set forth above, the present invention employs a converging lens group which is approximate to the Sonnar type comprising the five components as already described. This converging group will hereinafter be referred to as Type I. By this, the present invention has been successful in making compact a wide angle zoom lens having a construction characteristic to the Sonnar type in which the principal point of the lens system lies forwardly of the system and which permits a great aperture, and overcoming the tendency of the Petzval sum becoming negative. In the converging lens group formed by such five components, it is desirable that the refractive indices of the sixth member or the positive lens component $L_6$ and the seventh member or the positive meniscus lens component $L_7$ be less than 1.65 and the refractive index of the eighth member or the negative lens component $L_8$ be higher by 0.17 or more than said refractive indices. By adding such two conditions it is possible to bring the Petzval sum more toward the positive direction and realize further compactness without adversely affecting the other aberrations.

On the other hand, where a wider angle of view is desired, the power of the diverging lens group may be relatively intensified with respect to that of the converging lens group but in that case, the backward converging lens group must be made capable of withstanding a greater angle of view in terms of aberration. Therefore, the positive lens component which is the ninth member $L_9$ in the converging lens group which is closest to the image side may be divided into two positive lenses $L_{9a}$, $L_{9b}$, whereby there may be provided the effect of rendering the distortion to the positive and the freedom of correction of the curvature of image field and thus, it is possible to provide a zoom lens which can use at a wider angle of view, say, 81.6°. This converging group will hereinafter referred to as Type II. Also, if further compactness is desired, it becomes necessary that the negative curvature of image plane created by the positive lenses located forwardly of the negative lens component of the eighth member $L_8$ is corrected to the positive by bending of the air lens formed by the surface of this negative lens component $L_8$ which is concave to the image side and the object-looking surface of the divided positive lens $L_{9a}$ closer to the object side. In order that the increase in over-correction of the spherical aberration created at the long focal distance side by such bending may be eliminated by the bending of the divided positive lens closer to the object side $L_{9a}$, it is desirable that such divided positive lens closer to the object side $L_{9a}$ may be made into a convex meniscus form with respect to the image side.

Further, in such a construction wherein the positive lens component of the converging lens group which is closest to the image side $L_9$ is divided into the two positive lenses $L_{9a}$, $L_{9b}$, the two components, namely, the positive lens component of the sixth member $L_6$ and the positive meniscus lens component of the seventh member $L_7$ which is convex to the object side, may be united together into a single positive meniscus lens $L_{67}$ which is convex to the object side, whereby it becomes possible to provide a zoom optical system covering a half angle of view of the order of 31°. With such a construction, it becomes possible to forwardly shift the entrance pupil of the converging lens group and thus, forwardly shift the entrance pupil of the entire lens system, so that a more compact zoom optical system may be provided. This converging group will hereinafter be referred to as Type III.

In the wide angle lens system of the present invention constructed in the manner as described above, a single type of the diverging lens group is usable in common with three alternative types of the converging lens group. These may be classified as follows, for various examples which will further be described.

Type I ... Examples 1 to 3
Type II ... Examples 4 to 8
Type III ... Example 9

In the present invention, the above-mentioned common diverging group forms the greatest feature and it is desirable that the focal lengths of the individual lens components of the diverging group satisfy the following conditions:

$$1.2 < |f_{11}|/|f_1| < 3.8,$$

$$1.8 < f_{12}/|f_1| < 4.0,$$

$$0.4 < |f_{13}|/|f_1| < 1.2 \text{ and}$$

$$1.2 < f_{14}/|f_1| < 3.8$$

where $f_1$ represents the total focal length of the diverging lens group, $f_{1i}$ the focal lengths of the individual lens components in the diverging group, and the suffix i the order of the lens components from the object side. For such a power arrangement of the diverging group, it is more desirable that the shape factor of the three lens components in the diverging group, except the negative lens component of the third member, be determined as follows, whereby correction of various aberrations may become easier to do.

$$1.3 < Q_{11} < 8.2,$$

$$0.5 < Q_{12} < 1.5 \text{ and}$$

$$-5.1 < Q_{14} < -1.5,$$

where $Q_{1i}$ represents the shape factor of each lens component in the diverging group, the suffix i represents the order of each lens component from the object side, and Q is defined as $$Q = (r_F + r_R)/(r_F - r_R),$$

where $r_F$ and $r_R$ represent the curvature radii of the formost and rearmost surfaces, respectively, of each lens component.

Under such a construction of the common diverging group, it is desirable that the respective types of the converging group satisfy the conditions shown below. First, for the power arrangement of each lens component, the following conditions are set:

| Type I | Type II | Type III |
|---|---|---|
| $2.8 < \dfrac{f_{21}}{f_2} < 4.5$ | $1.9 < \dfrac{f_{21}}{f_2} < 3.5$ | $1.0 < \dfrac{f_{21}}{f_2} < 1.5$ |
| $1.0 < \dfrac{f_{22}}{f_2} < 1.8$ | $1.1 < \dfrac{f_{22}}{f_2} < 1.9$ | |
| | | $0.9 < \dfrac{f_{22}}{f_2} < 1.4$ |
| $1.1 < \dfrac{f_{23}}{f_2} < 2.0$ | $1.1 < \dfrac{f_{23}}{f_2} < 3.5$ | |
| $0.4 < \dfrac{|f_{24}|}{f_2} < 0.6$ | $0.4 < \dfrac{|f_{24}|}{f_2} < 0.6$ | $0.4 < \dfrac{|f_{23}|}{f_2} < 0.6$ |
| | $1.0 < \dfrac{f_{25}}{f_2} < 3.5$ | $1.1 < \dfrac{f_{24}}{f_2} < 1.6$ |
| $0.9 < \dfrac{f_{25}}{f_2} < 1.1$ | | |
| | $1.2 < \dfrac{f_{26}}{f_2} < 4.0$ | $3.3 < \dfrac{f_{25}}{f_2} < 3.8$ |

In the foregoing, $f_2$ represents the total focal length of the converging group, $f_{2i}$ the focal length of each lens component in the converging group, and the suffix i the order of each lens component from the object side.

In each type of such power arrangement, it is further desirable to determine the shape factor of each lens component and thus, the various aberrations can be corrected easily.

| Type I | Type II | Type III |
|---|---|---|
| $-0.9 < Q_{24} < -0.1$ | $-1.3 < Q_{21} < -0.5$ | $-0.9 < Q_{21} < -0.4$ |
| $-1.0 < Q_{22} < -0.7$ | $-1.5 < Q_{22} < -0.9$ | |
| $-3.4 < Q_{23} < -1.5$ | $-6.2 < Q_{23} < -1.3$ | $-2.4 < Q_{22} < -1.9$ |
| $0.8 < Q_{24} < 1.4$ | $0.4 < Q_{24} < 1.2$ | $0.5 < Q_{23} < 1.0$ |
| | $0.4 < Q_{25} < 1.5$ | $1.0 < Q_{24} < 1.5$ |
| $0.8 < Q_{24} < 1.4$ | $-1.0 < Q_{26} < 1.3$ | $-4.4 < Q_{25} < -3.9$ |

In the foregoing, $Q_{2i}$ represents the shape factor of each lens component in the converging group, and the suffix i the order of each lens component from the object side.

Thus, it has become possible to provide a wide angle zoom lens system in which the various aberrations are corrected in a well-balanced manner while the distortion is maintained equivalent to that of a single focal length lens and the diameter of the forward lens is so small that the entire lens system is compact. As to the various performances of this wide angle lens system, the angle of view during the shortest focal length condition thereof ranges from 62° to maximum 81.6°, the zoom ratio is about 2.0 and the F-number is 3.5 to 4.0, and even the high degrees of chromatic aberration are sufficiently corrected.

Various examples of the present invention will now be described in detail. In any of nine examples of the wide angle zoom lens system according to the present invention, the zoom ratio is about 2.0 and F-number is of the order to 3.5 to 4.0 Examples 1, 2 and 9 respectively cover an angle of view of 62° at the shortest focal length side, Example 7 covers an angle of view of 74° and the other examples are ultra-wide angle zoom lenses which cover 80° or more. In any of these examples, the various aberrations are well corrected and especially, the distortion is so well corrected as it is comparable to or superior to the single focal length lens and the lens shape is compact.

In the two-group zoom lens system of the present invention, the air space between the two groups and accordingly, the entire shape, become maximum during the shortest focal length condition. It may thus be said that the size of such two-group zoom lens system is smaller as the distance from the foremost lens surface to the back focal plane during the shortest focal length condition is smaller. The size of the lens system as a zoom lens must be compared with the focal length, the zoom ratio, F-number, etc. taken into account, and for reference, the ratio of the distance L from the foremost lens surface to the back focal plane during the shortest focal length condition to the shortest focal length fw will be shown with respect to each example.

|  | Examples | | | | | | | | |
|---|---|---|---|---|---|---|---|---|---|
|  | 1 | 2 | 3 | 4 | 5 | 6 | 7 | 8 | 9 |
| L | 126.44 | 130.87 | 117.33 | 133.76 | 146.50 | 134.34 | 147.68 | 140.47 | 148.82 |
| fw | 36.02 | 36.02 | 25.00 | 25.04 | 25.00 | 36.02 | 25.50 | 28.65 | 25.50 |
| L/fw | 3.51 | 3.63 | 4.69 | 5.34 | 5.86 | 3.73 | 5.79 | 4.90 | 5.84 |

Figure 2:
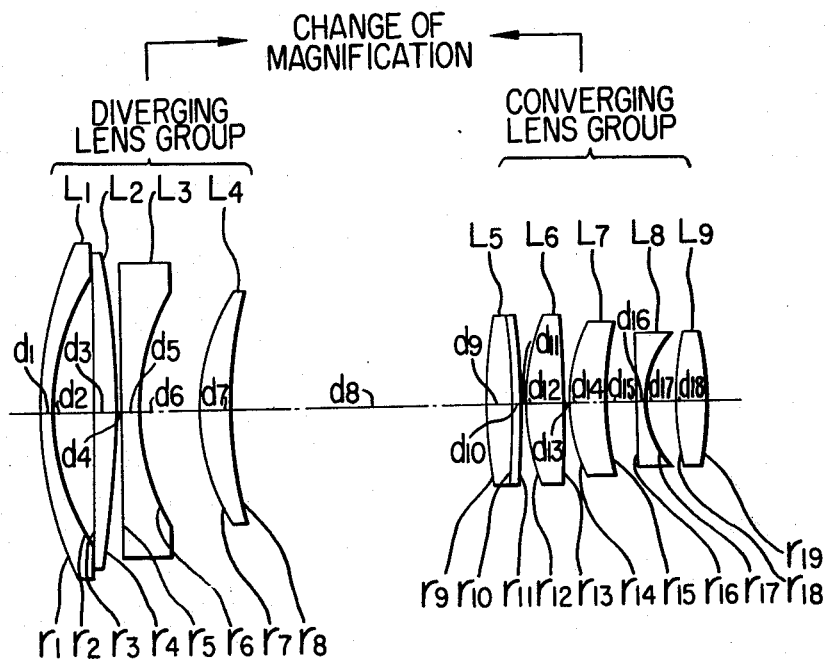
Figure 10:
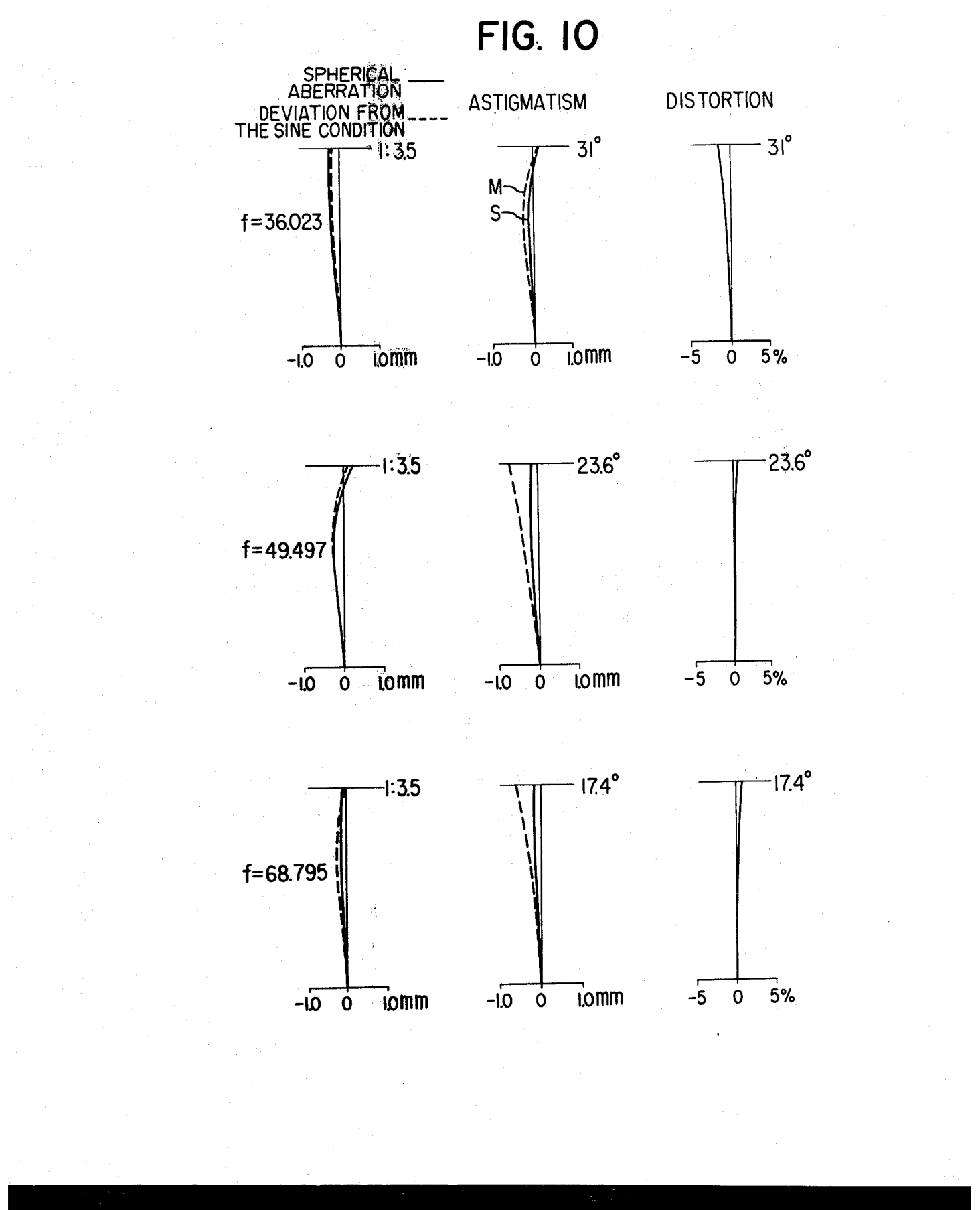
Figure 11:
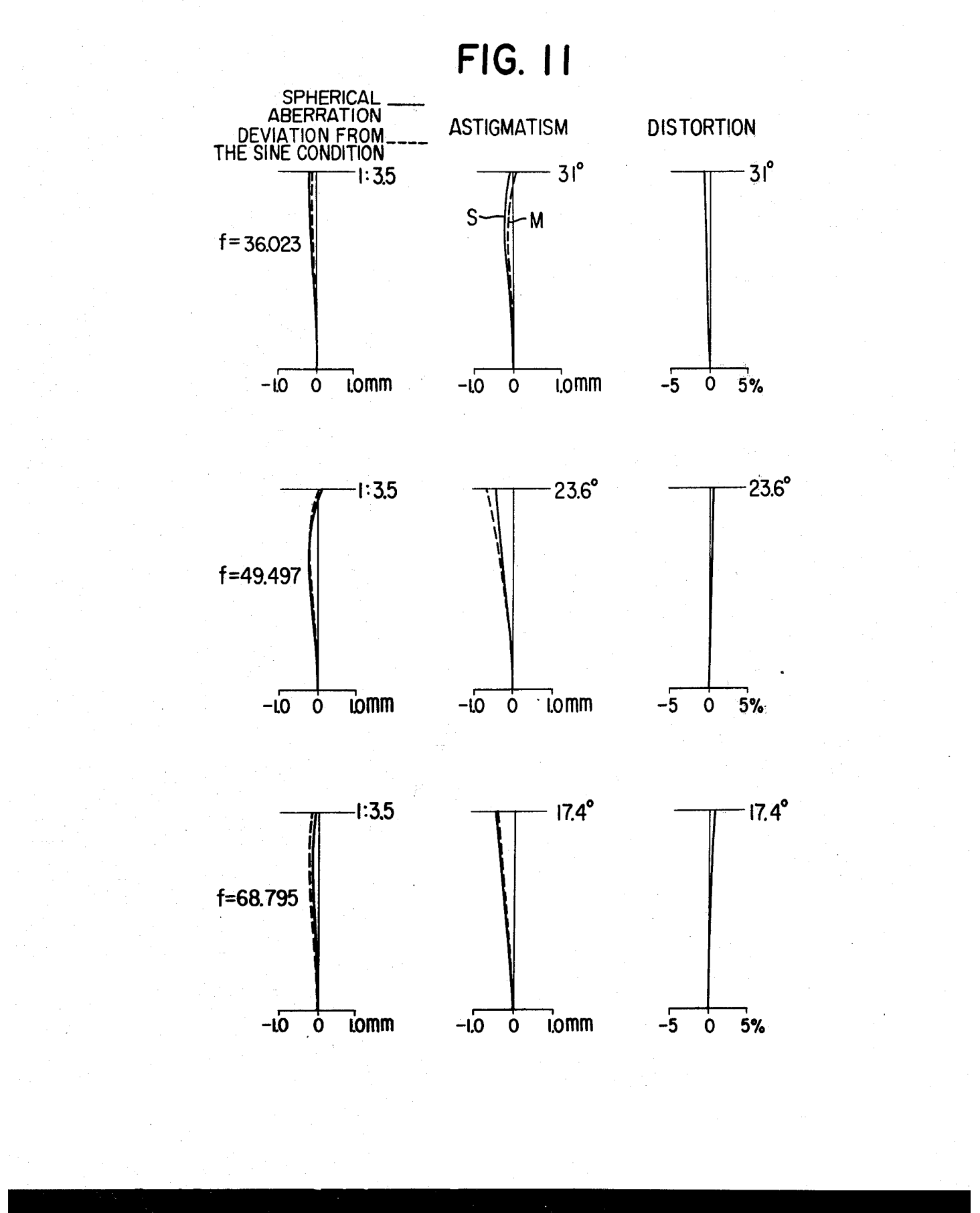

Example 1 is a basic form of the zoom lens system according to the present invention. In this basic form, any desired positive lens component in the converging lens group may be formed as a doublet to thereby facilitate the correction of the axial chromatic aberration and reduce the chromatic variation in spherical aberration at the longest focal length side, and herein such effects are attained in Example 2 wherein the fifth member of the positive lens component $L_5$ is a doublet. Numerical data in Examples 1 and 2 will be shown below, and the lens arrangement of these Examples in their shortest focal length condition are shown in FIGS. 1 and 2, while various aberrations in these Examples are illustrated in FIGS. 10 and 11.

EXAMPLE 1

Total focal length: 36.023-49.497-68.795
F-number: 3.5
Maximum angle of view: 62°
Back focal distance: 43.776-53.991-68.622

$f_1 = -53.0$
| $r_1 = 50.379$ | $d_1 = 1.3$ | $n_1 = 1.74443$ | $\nu_1 = 49.4$ |
| $r_2 = 27.469$ | $d_2 = 6.3$ | | |
| $r_3 = 670.373$ | $d_3 = 3.5$ | $n_2 = 1.5168$ | $\nu_2 = 64.2$ |
| $r_4 = -114.009$ | $d_4 = 0.1$ | | |
| $r_5 = \infty$ | $d_5 = 1.8$ | $n_3 = 1.713$ | $\nu_3 = 53.9$ |
| $r_6 = 32.531$ | $d_6 = 8.4$ | | |
| $r_7 = 35.195$ | $d_7 = 3.4$ | $n_4 = 1.76182$ | $\nu_4 = 26.5$ |
| $r_8 = 57.719$ | $d_8 = 29.009$ | $-12.916-0.846$ | |

$f_2 = 40.182$
| $r_9 = 101.102$ | $d_9 = 3.0$ | $n_5 = 1.5168$ | $\nu_5 = 64.2$ |
| $r_{10} = -763.611$ | $d_{10} = 0.1$ | | |
| $r_{11} = 28.387$ | $d_{11} = 66.4$ | $n_6 = 1.52$ | $\nu_6 = 70.1$ |
| $r_{12} = -449.780$ | $d_{12} = 0.1$ | | |
| $r_{13} = 19.335$ | $d_{13} = 5.9$ | $n_7 = 1.52$ | $\nu_7 = 70.1$ |
| $r_{14} = 37.463$ | $d_{14} = 4.0$ | | |
| $r_{15} = -564.061$ | $d_{15} = 1.4$ | $n_8 = 1.80518$ | $\nu_8 = 25.5$ |
| $r_{16} = 16.279$ | $d_{16} = 3.85$ | | |
| $r_{17} = 44.719$ | $d_{17} = 4.1$ | $n_9 = 1.6727$ | $\nu_9 = 32.2$ |
| $r_{18} = -56.902$ | | | |

In order from the object side, $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

EXAMPLE 2

Total focal length: 36.023-49.497-68.796
F-number: 3.5
Maximum angle of view: 62°
Back focal distance: 43.491-52.793-66.114

$f_1 = -59.942$
| $r_1 = 52.287$ | $d_1 = 1.5$ | $n_1 = 1.72342$ | $_1 = 38.0$ |
| $r_2 = 35.517$ | $d_2 = 4.9$ | | |
| $r_3 = \infty$ | $d_3 = 4.0$ | $n_2 = 1.5168$ | $_2 = 64.2$ |
| $r_4 = -98.799$ | $d_4 = 0.1$ | | |
| $r_5 = 879.752$ | $d_5 = 2.0$ | $n_3 = 1.72$ | $_3 = 50.3$ |
| $r_6 = 27.242$ | $d_6 = 8.5$ | | |
| $r_7 = 34.469$ | $d_7 = 3.9$ | $n_4 = 1.76182$ | $_4 = 26.5$ |
| $r_8 = 61.405$ | $d_8 = 33.625$ | $-14.882-0.825$ | |

$f_2 = 41.379$
| $r_9 = 117.209$ | $d_9 = 3.5$ | $n_5 = 1.62299$ | $_5 = 58.1$ |
| $r_{10} = -98.386$ | $d_{10} = 1.0$ | $n_6 = 1.80518$ | $_6 = 25.5$ |
| $r_{11} = 323.279$ | $d_{11} = 0.1$ | | |
| $r_{12} = -28.810$ | $d_{12} = 5.75$ | $n = 1.51118$ | $_7 = 50.9$ |
| $r_{13} = 516.415$ | $d_{13} = 0.1$ | | |
| $r_{14} = 19.119$ | $d_{14} = 5.2$ | $n_8 = 1.51118$ | $_8 = 50.9$ |
| $r_{15} = 39.311$ | $d_{15} = 2.9$ | | |
| $r_{16} = \infty$ | $d_{16} = 2.5$ | $n_9 = 1.80518$ | $_9 = 25.5$ |
| $r_{17} = 16.622$ | $d_{17} = 4.0$ | | |
| $r_{18} = 50.614$ | $d_{18} = 3.8$ | $n_{10} = 1.61293$ | $_{10} = 36.9$ |
| $r_{19} = -48.431$ | | | |

In order from the object side, $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenes.

Figure 3:
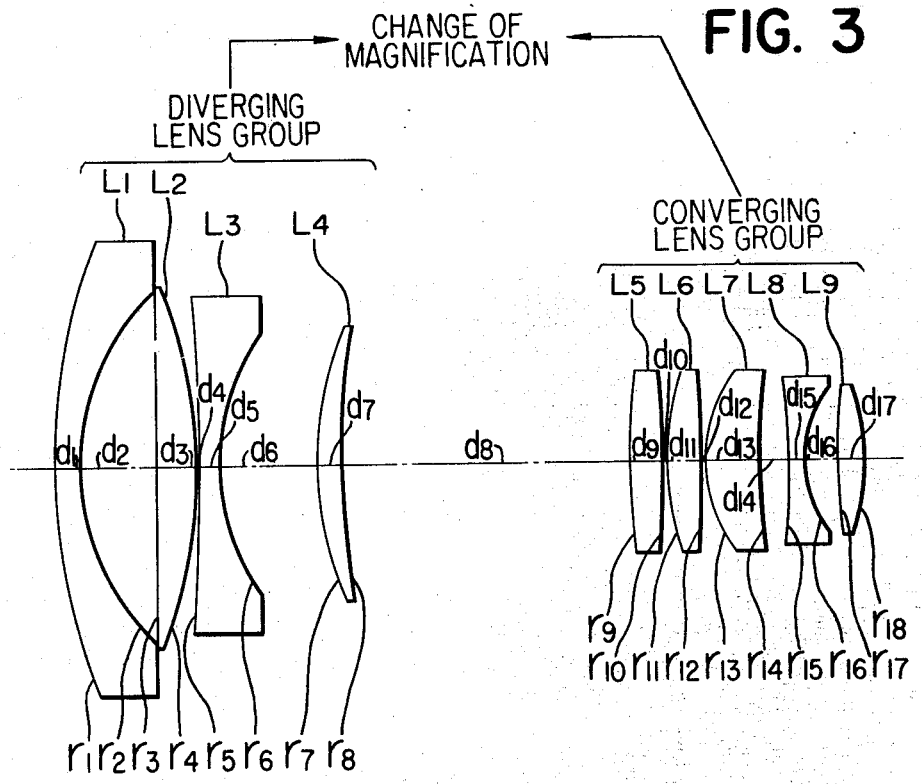

Example 3 is substantially identical in lens arrangement to the Example 1, but as already noted, in the diverging group thereof, the Abbe numbers of glass for the diverging lens components are selected to greater values than those for the converging lens components to thereby sufficiently corrent even the high degrees of chromatic aberration such as the imbalance of the chromatic difference of magnification attributable to the angle of view and the mismatching of the image field curvature resulting from the chromatic difference, and the result is the provision of a zoom lens covering a wider angle of view. The numerical data of this Example will be shown below, and the lens arrangement thereof during the shortest focal length condition is shown in FIG. 3 while the various aberrations therein are illustrated in FIG. 12.

EXAMPLE 3

Total focal length: 25.50-35.150-48.805
F-number: 4
Maximum angle of view: 80.6°
Back focal distance: 40.102-48.838-61.200

$f_1 = -45.379$
| | | |
|---|---|---|
| $r_1=80.0$ | $d_1=3.5$ | $n_1=1.77279$ $\nu_1=49.4$ |
| $r_2=32.471$ | $d_2=10.0$ | |
| $r_3=-1000.0$ | $d_3=5.0$ | $n_2=1.60342$ $\nu_2=38.0$ |
| $r_4=-68.877$ | $d_4=0.1$ | |
| $r_5=-429.670$ | $d_5=3.3$ | $n_3=1.80279$ $\nu_3=46.8$ |
| $r_6=30.696$ | $d_6=12.9$ | |
| $r_7=42.617$ | $d_7=3.6$ | $n_4=1.71736$ $\nu_4=29.5$ |
| $r_8=93.788$ | $d_8=38.834 - 18.764 - 3.925$ | |

$f_2 = 41.082$
| | | |
|---|---|---|
| $r_9=109.554$ | $d_9=4.2$ | $n_5=1.53172$ $\nu_5=48.9$ |
| $r_{10}=-184.418$ | $d_{10}=0.1$ | |
| $r_{11}=37.007$ | $d_{11}=5.1$ | $n_6=1.50137$ $\nu_6=56.5$ |
| $r_{12}=-459.818$ | $d_{12}=0.1$ | |
| $r_{13}=21.134$ | $d_{13}=7.6$ | $n_7=1.50137$ $\nu_7=56.5$ |
| $r_{14}=73.546$ | $d_{14}=3.5$ | |
| $r_{15}=-154.35$ | $d_{15}=2.4$ | $n_8=1.79504$ $\nu_8=28.4$ |
| $r_{16}=17.663$ | $d_{16}=3.54$ | |
| $r_{17}=53.968$ | $d_{17}=3.8$ | $n_9=1.46450$ $\nu_9=65.8$ |
| $r_{18}=-27.275$ | | |

In order from the object side, $r_1$, $r_2$, $r_3$, ... represent the curvature radii of the refracting surfaces of the lenses, $d_1$, $d_2$, $d_3$, ... represent the center thickness of the lenses and the air spaces therebetween, and $n_1$, $n_2$, $n_3$, ... and $\nu_1$, $\nu_2$, $\nu_3$, ... represent the refractive indices and Abbe number of the lenses.

Example 4 is a basic form of the present invention in which the positive lens component $L_9$ which is the ninth member located closest to the image side in Example 1 is divided into two positive lenses $L_{9a}$, $L_{9b}$ to thereby increase the angle of view. In this Example, by forming as a doublet the negative meniscus lens component $L_1$ which is the first member, the negative lens component $L_3$ which is the third member, or the positive meniscus lens component $L_4$ which is the fourth member in the diverging lens group, it is possible to adopt a great Abbe number for the positive lens component $L_2$ which is the second member and facilitate the correction of the high degrees of chromatic aberration. Further, by forming as a doublet the positive lens component $L_2$ which is the second member, it will also be possible to further increase the equivalent Abbe number and facilitate the correction of the high degrees of chromatic aberration, but in the present Example, the negative lens component $L_3$ which is the third member is formed as a doublet to provide the effect of correcting such chromatic aberration.

Figure 4:
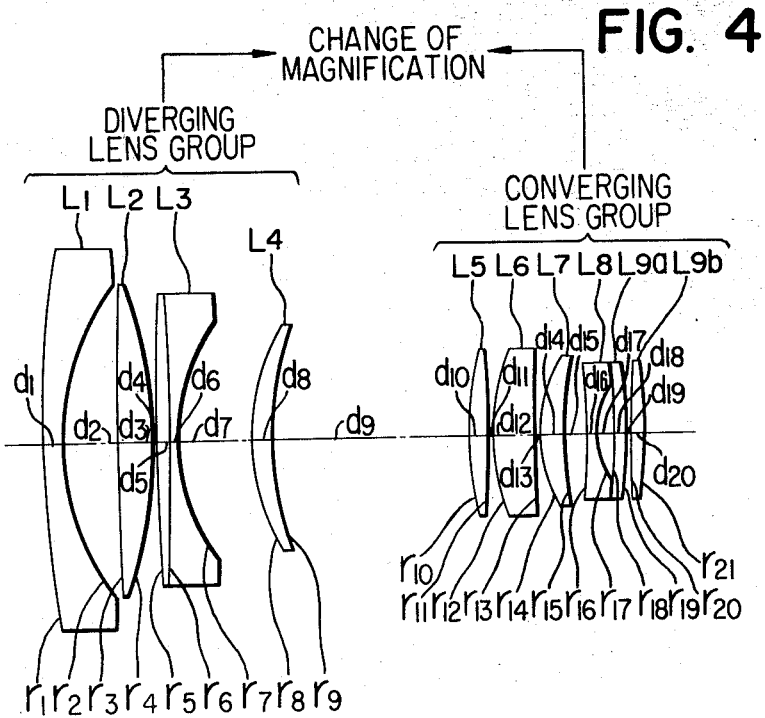
Figure 5:
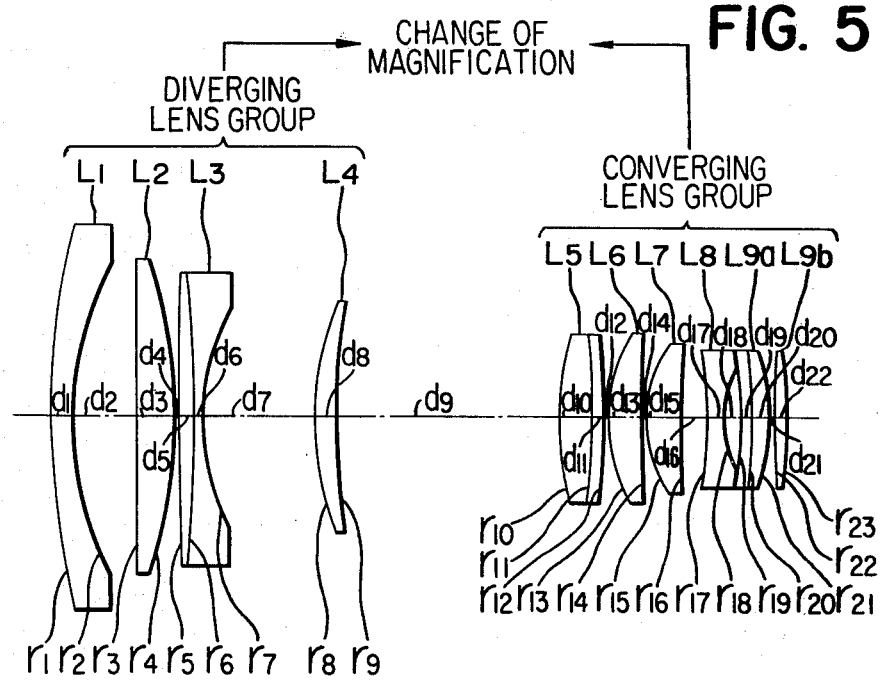
Figure 6:
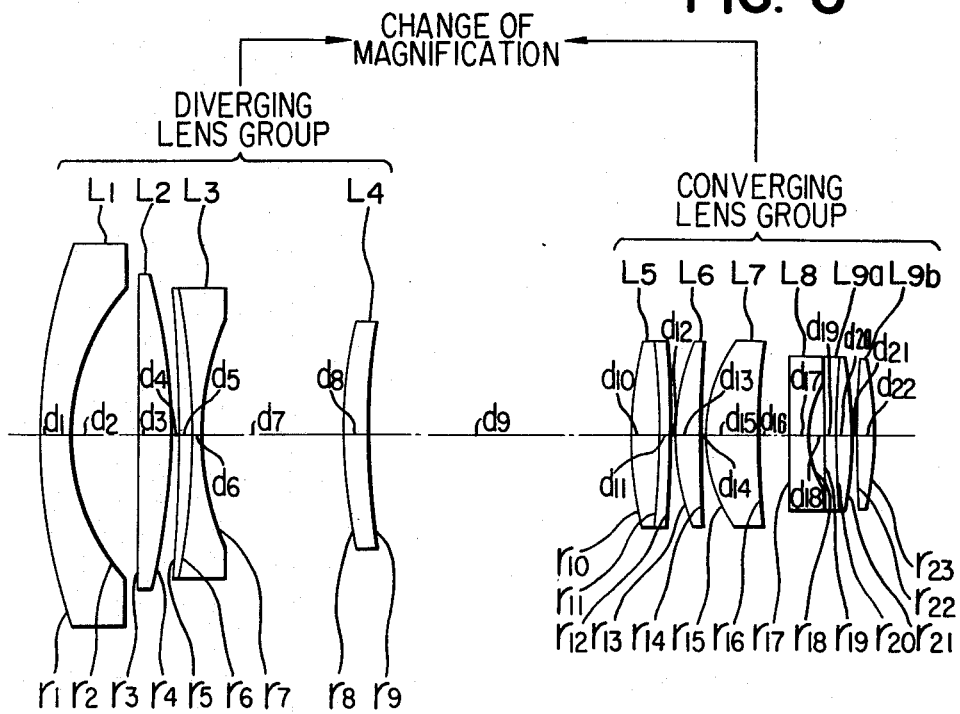
Figure 13:
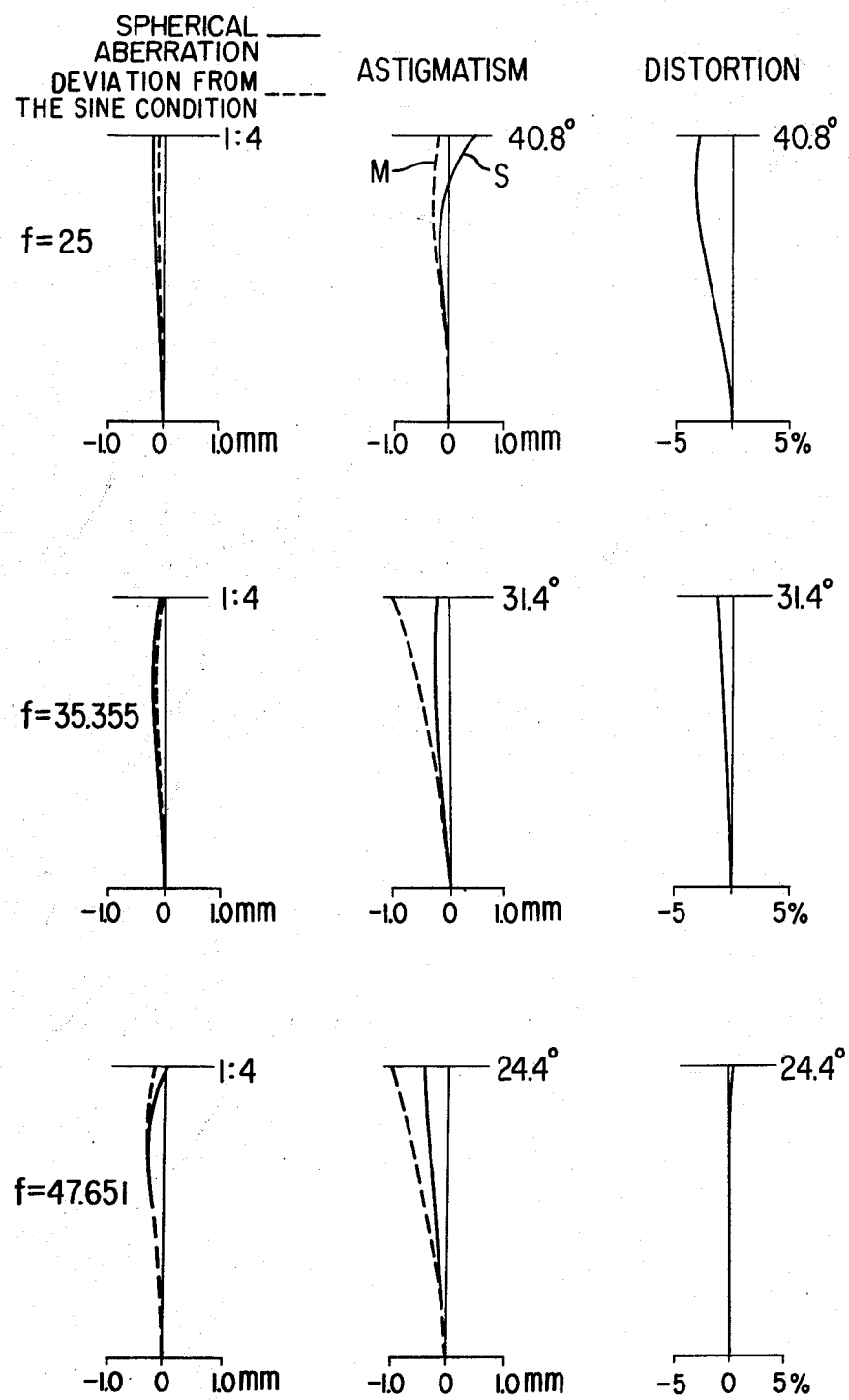
Figure 15:
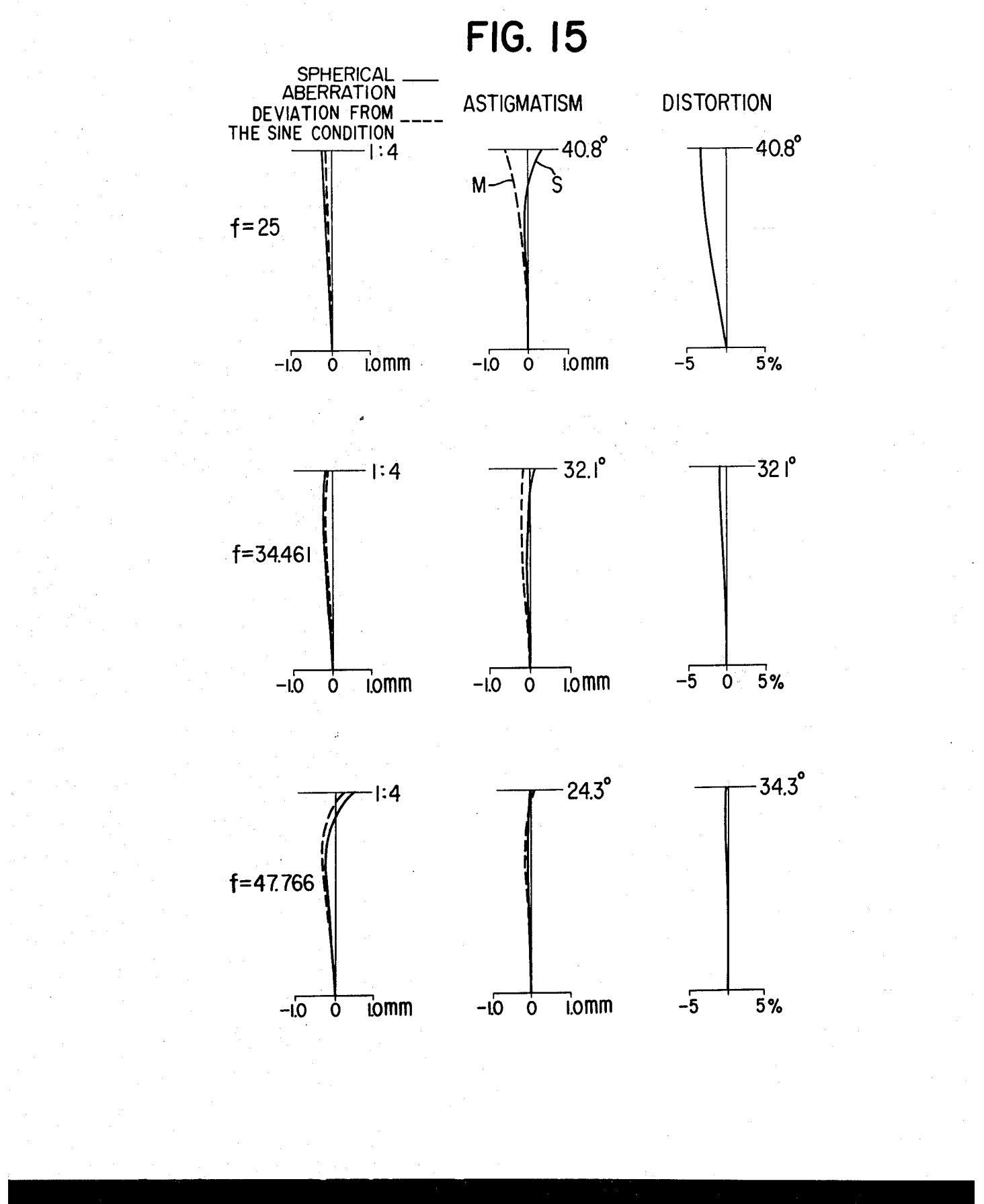

Examples 5 and 6 are the forms in which one of the two divided positive lens components $L_{9a}$ in Example 4 which is closer to the object side is formed as a doublet and this positive lens is designed with a low refractive index while the negative lens is designed with a high refractive index, thereby well correcting the Petzval sum. Again in these Examples, the effect similar to that of Example 2 is further added. The numerical data of Examples 4, 5 and 6 will be shown below, and the lens arrangements of these Examples during their shortest focal length condition are shown in FIGS. 4, 5 and 6, while the various aberrations in these Examples are illustrated in FIGS. 13, 14 and 15.

EXAMPLE 4

Total focal length: 25-35.355-47.625
F-number: 4
Maximum angle of view: 81.6°
Back focal distance: 37.831-46.655-57.134

$f_1 = -40.0$
| | | |
|---|---|---|
| $r_1=160.$ | $d_1=3.2$ | $n_1=1.713$ $\nu_1=53.9$ |
| $r_2=33.8$ | $d_2=6.5$ | |
| $r_3=365.63$ | $d_3=4.7$ | $n_2=1.5168$ $\nu_2=64.2$ |
| $r_4=-62.5$ | $d_4=0.1$ | |
| $r_5=430.791$ | $d_5=2.0$ | $n_3=1.74$ $\nu_3=28.2$ |
| $r_6=500.$ | $d_6=0.7$ | $n_4=1.713$ $\nu_4=53.9$ |
| $r_7=23.05$ | $d_7=10.5$ | |
| $r_8=30.503$ | $d_8=2.8$ | $n_5=1.80518$ $\nu_5=25.5$ |
| $r_9=46.128$ | $9=26.364-10.390-0.439$ | |

$f_2 = 34.087$
| | | |
|---|---|---|
| $r_{10}=49.$ | $d_{10}=1.9$ | $n_6=1.52$ $\nu_6=70.1$ |
| $r_{11}=573.031$ | $d_{11}=0.1$ | |
| $r_{12}=26.375$ | $d_{12}=6.3$ | $n_7=1.52$ $\nu_7=70.1$ |
| $r_{13}=220.$ | $d_{13}=0.1$ | |
| $r_{14}=18.845$ | $d_{14}=3.5$ | $n_8=1.52$ $\nu_8=70.1$ |
| $r_{15}=89.339$ | $d_{15}=3.1$ | |
| $r_{16}=-94.098$ | $d_{16}=1.43$ | $n_9=1.71736$ $\nu_9=29.5$ |
| $r_{17}=15.751$ | $d_{17}=2.1$ | |
| $r_{18}=-400.$ | $d_{18}=2.0$ | $n_{10}=1.62041$ $\nu_{10}=60.3$ |
| $r_{19}=-52.854$ | $d_{19}=0.1$ | |
| $r_{20}=-557.09$ | $d_{20}=2.0$ | $n_{11}=1.62374$ $\nu_{11}=47.0$ |
| $r_{21}=-35.592$ | | |

In order from the object side, $r_1$, $r_2$, $r_3$, ... represent the curvature radii of the refracting surfaces of the lenses, $d_1$, $d_2$, $d_3$, ... represent the center thickness of the lenses and the air spaces therebetween, and $n_1$, $n_2$, $n_3$, ... and $\nu_1$, $\nu_2$, $\nu_3$, ... represent the refractive indices and Abbe numbers of the lenses.

EXAMPLE 5

Total focal length: 25.041-34.500-44.533
F-number: 4
Maximum angle of view: 81.6°
Back focal distance: 38.002-46.370-55.244

$f_1 = -43.706$
| | | |
|---|---|---|
| $r_1=107.$ | $d_1=2.0$ | $n_1=1.74443$ $\nu_1=49.4$ |
| $r_2=32.9$ | $d_2=9.0$ | |
| $r_3=\infty$ | $d_3=5.1$ | $n_2=1.5168$ $\nu_2=64.2$ |
| $r_4=-71.174$ | $d_4=0.1$ | |
| $r_5=1000.$ | $d_5=2.2$ | $n_3=1.80518$ $\nu_3=25.5$ |
| $r_6=-200.$ | $d_6=0.8$ | $n_4=1.76684$ $\nu_4=46.6$ |
| $r_7=31.$ | $d_7=15.1$ | |
| $r_8=42.614$ | $d_8=2.4$ | $n_5=1.80518$ $\nu_5=25.5$ |
| $r_9=68.786$ | $d_{29.957}$ | $-11.454-0.421$ |

$f_2 = 38.662$
| | | |
|---|---|---|
| $r_{10}=51.375$ | $d_{10}=4.0$ | $n_6=1.50137$ $\nu_6=56.5$ |
| $r_{11}=158.$ | $d_{11}=-1.5$ | $n_7=1.74$ $\nu_7=28.2$ |
| $r_{12}=-200.$ | $d_{12}=0.1$ | |
| $r_{13}=24.778$ | $d_{13}=4.8$ | $n_8=1.50137$ $\nu_8=56.5$ |
| $r_{14}=671.508$ | $d_{14}=0.1$ | |
| $r_{15}=24.7$ | $d_{15}=4.7$ | $n_9=1.50137$ $\nu_9=56.5$ |
| $r_{16}=117.445$ | $d_{16}=3.6$ | |
| $r_{17}=-67.089$ | $d_{17}=2.3$ | $n_{10}=1.80518$ $\nu_{10}=25.5$ |
| $r_{18}=18.$ | $d_{18}=2.4$ | |
| $r_{19}=-40.755$ | $d_{19}=0.8$ | $n_{11}=1.61025$ $\nu_{11}=56.5$ |
| $r_{20}=-500.$ | $d_{20}=2.7$ | $n_{12}=1.50137$ $\nu_{12}=56.5$ |
| $r_{21}=-23.$ | $d_{21}=0.1$ | |
| $r_{22}=173.125$ | $d_{22}=2.0$ | $n_{13}-4.56732$ $\nu_{13}=42.8$ |
| $r_{23}=-43.441$ | | |

In order from the object side, $r_1$, $r_2$, $r_3$, ... represent the curvature radii of the refracting surfaces of the lenses, $d_1$, $d_2$, $d_3$, ... represent the center thickness of the lenses and the air spaces therebetween, and $n_1$, $n_2$, $n_3, \ldots$ and $\nu_1, \nu_2, \nu_3, \ldots$ represent the refractive indices and Abbe number of the lenses.

EXAMPLE 6

Total focal length: 25.00-34.461-47.766
F-number: 4
Maximum angle of view: 81.6°
Back focal distance: 38.828-47.392-59.437

| | | | | |
|---|---|---|---|---|
| | $r_1 = 74.96$ | $d_1 = 3.7$ | $n_1 = 1.76684$ | $\nu_1 = 46.6$ |
| | $r_2 = 31.585$ | $d_2 = 9.3$ | | |
| | $r_3 = -1100.000$ | $d_3 = 4.8$ | $n_2 = 1.50137$ | $\nu_2 = 56.5$ |
| $f_1 =$ | $r_4 = -67.23$ | $d_4 = 0.1$ | | |
| $-44.489$ | $r_5 = -190.332$ | $d_5 = 2.1$ | $n_3 = 1.80985$ | $\nu_3 = 22.9$ |
| | $r_6 = -89.000$ | $d_6 = 1.0$ | $n_4 = 1.76684$ | $\nu_4 = 46.6$ |
| | $r_7 = 36.661$ | $d_7 = 18.5$ | | |
| | $r_8 = 56.600$ | $d_8 = 3.5$ | $n_5 = 1.74$ | $\nu_5 = 28.2$ |
| | $r_9 = 113.765$ | $d_9 = 35.020 - 15.341 - 0.861$ | | |
| | $r_{10} = 56.000$ | $d_{10} = 3.5$ | $n_6 = 1.53172$ | $\nu_6 = 48.9$ |
| | $r_{11} = -121.000$ | $d_{11} = 1.5$ | $n_7 = 1.80518$ | $\nu_7 = 25.5$ |
| | $r_{12} = -275.395$ | $d_{12} = 0.1$ | | |
| | $r_{13} = 31.2$ | $d_{13} = 3.9$ | $n_8 = 1.50137$ | $\nu_8 = 56.5$ |
| | $r_{14} = 220.000$ | $d_{14} = 0.1$ | | |
| | $r_{15} = 21.365$ | $d_{15} = 6.7$ | $n_9 = 1.50137$ | $\nu_9 = 56.5$ |
| $f_2 =$ | $r_{16} = 79.163$ | $d_{16} = 3.75$ | | |
| $40.276$ | $r_{17} = -554.$ | $d_{17} = 2.4$ | $n_{10} = 1.80518$ | $\nu_{10} = 25.5$ |
| | $r_{18} = 16.7$ | $d_{18} = 1.9$ | | |
| | $r_{19} = 350.$ | $d_{19} = 1.1$ | $n_{11} = 1.6968$ | $\nu_{11} = 55.6$ |
| | $r_{20} = 87.133$ | $d_{20} = 2.5$ | $n_{12} = 1.50137$ | $\nu_{12} = 56.5$ |
| | $r_{21} = -54.953$ | $d_{21} = 0.1$ | | |
| | $r_{22} = 167.188$ | $d_{22} = 2.1$ | $n_{13} = 1.59551$ | $\nu_{13} = 39.2$ |
| | $r_{23} = -62.039$ | | | |

In order from the object side, $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

Figure 7:
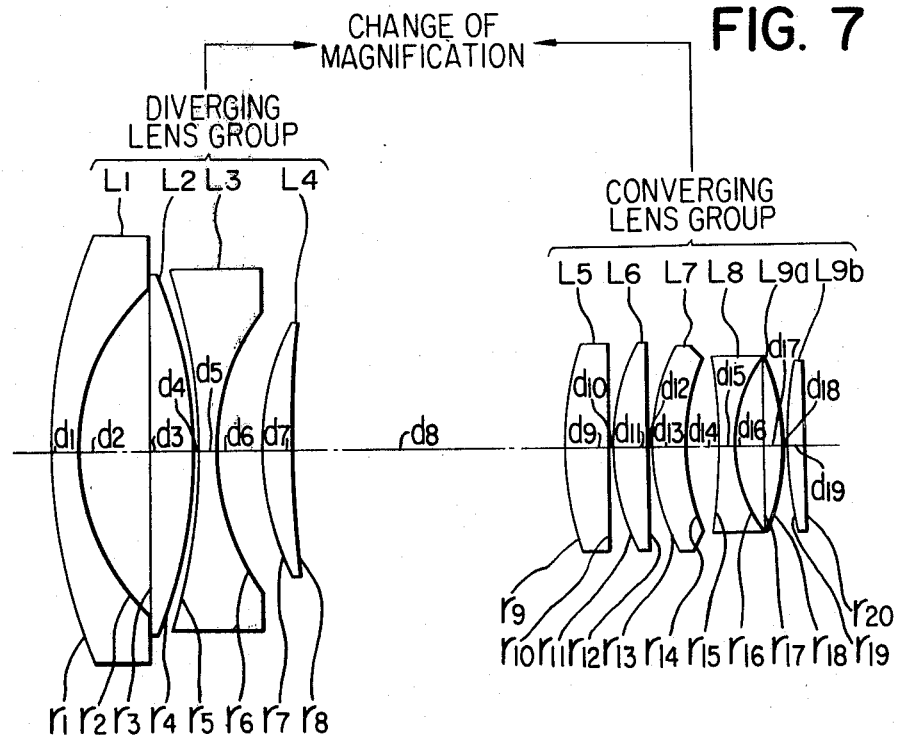
Figure 8:
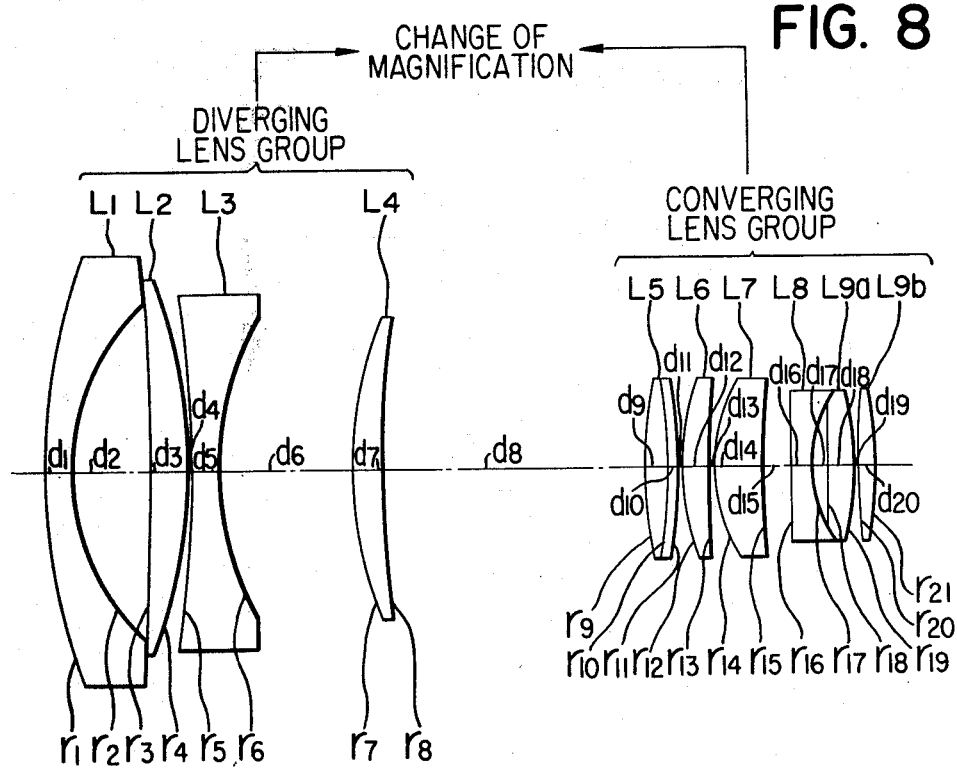
Figure 17:
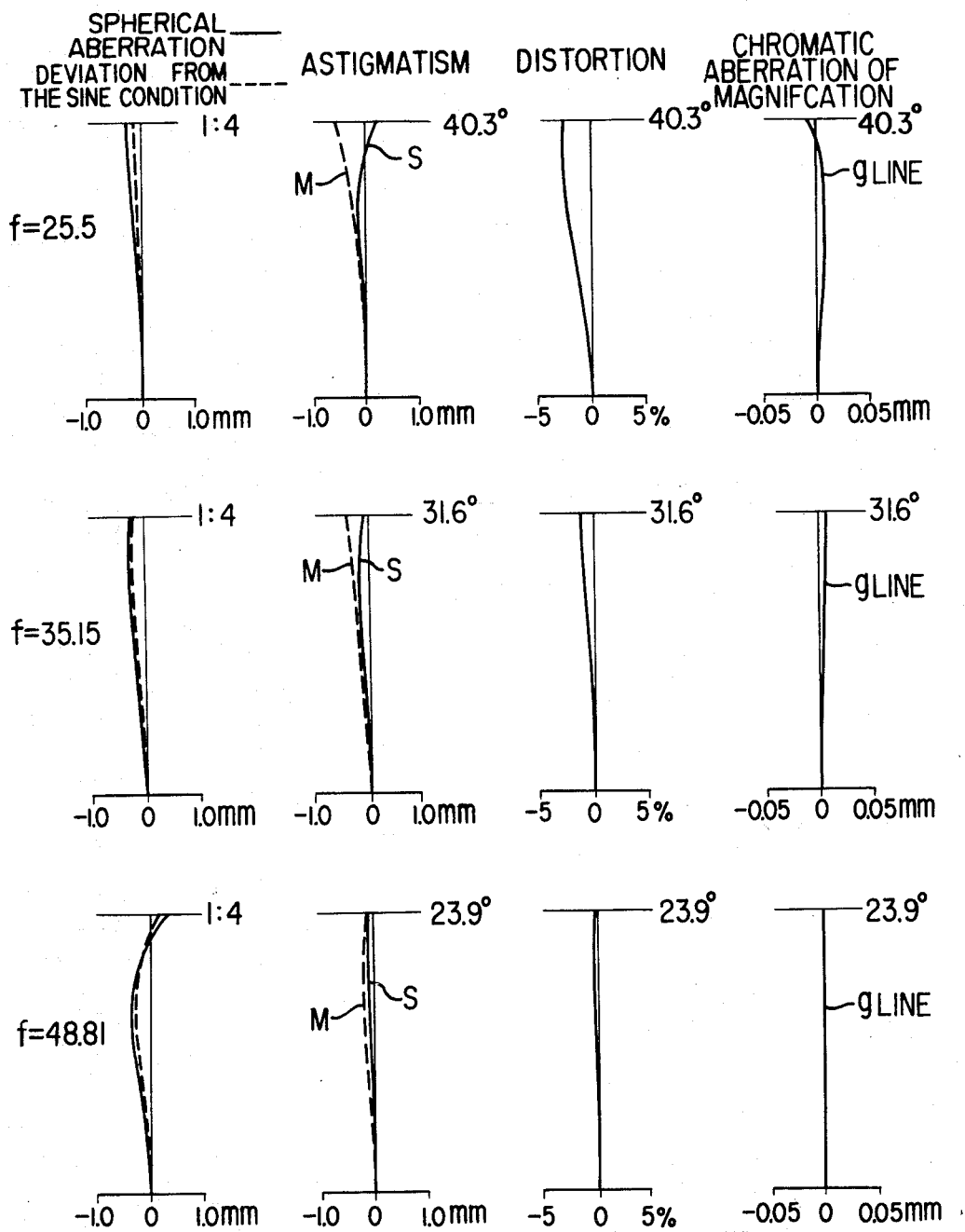

Example 7, like Example 3, is a form in which contrivances and given to the Abbe numbers of the convergent and the divergent components in the diverging lens group to thereby sufficiently correct the high degrees of chromatic aberration. Example 8 is a form similar to Example 7 but which achieves a zoom lens covering a wider angle of view. In this form, by making any desired convergent components in the converging lens group into a doublet, it will be possible to facilitate the correction of the axial chromatic aberration and to reduce the mismatching of the spherical aberration attributable to color in the longest focal length condition, but in the present Example, the foremost component in the converging lens group, namely, the positive lens component $L_5$ which is the fifth member is formed as a doublet to provide such effect. Numerical data of Examples 7 and 8 will be shown below, and the lens apparatus of these Examples in the shortest focal length condition are shown in FIGS. 7 and 8, while the aberrations in these Examples are illustrated in FIGS. 16 and 17. With regard to Example 8, the chromatic aberration of magnification is also shown to illustrate the well-corrected condition of the high degrees of chromatic aberration.

EXAMPLE 7

Total focal length: 28.647-39.469-54.512
F-number: 3.5
Maximum angle of view: 74°
Back focal distance: 40.724-49.439-61.556

| | | | | |
|---|---|---|---|---|
| | $r_1 = 72.6$ | $d_1 = 3.8$ | $n_1 = 1.76684$ | $\nu_1 = 46.6$ |
| | $r_2 = 30.519$ | $d_2 = 9.4$ | | |
| $f_1 =$ | $r_3 = 3000.0$ | $d_3 = 5.2$ | $n_2 = 1.56732$ | $\nu_2 = 42.8$ |
| $-50.0$ | $r_4 = -60.5$ | $d_4 = 0.1$ | | |
| | $r_5 = -118.686$ | $d_5 = 4.3$ | $n_3 = 1.76684$ | $\nu_3 = 46.6$ |
| | $r_6 = 31.5$ | $d_6 = 6.4$ | | |
| | $r_7 = 38.34$ | $d_7 = 3.5$ | $n_4 = 1.71736$ | $\nu_4 = 29.5$ |
| | $r_8 = 137.056$ | $d_8 = 36.742 - 17.469 - 3.389$ | | |
| | $r_9 = 48.95$ | $d_9 = 5.5$ | $n_5 = 1.52$ | $\nu_5 = 70.1$ |
| | $r_{10} = 2251.239$ | $d_{10} = 0.1$ | | |
| | $r_{11} = 25.58$ | $d_{11} = 5.2$ | $n_6 = 1.5168$ | $\nu_6 = 64.2$ |
| | $r_{12} = 576.194$ | $d_{12} = 0.1$ | | |
| $f_2 =$ | $r_{13} = 28.261$ | $d_{13} = 5.0$ | $n_7 = 1.6172$ | $\nu_7 = 54.0$ |
| $40.273$ | $r_{14} = 39.896$ | $d_{14} = 3.7$ | | |
| | $r_{15} = -71.6$ | $d_{15} = 2.1$ | $n_8 = 1.74$ | $\nu_8 = 28.2$ |
| | $r_{16} = 20.344$ | $d_{16} = 2.5$ | | |
| | $r_{17} = 170.7$ | $d_{17} = 3.7$ | $n_9 = 1.5725$ | $\nu_9 = 57.5$ |
| | $r_{18} = -32.0$ | $d_{18} = 0.1$ | | |
| | $r_{19} = 97.717$ | $d_{19} = 2.3$ | $n_{10} = 1.62606$ | $\nu_{10} = 39.1$ |
| | $r_{20} = -1452.182$ | | | |

In order from the object side, $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

Maximum angle of view: 62°
Back focal distance: 43.570-52.871-66.193

| | | | | |
|---|---|---|---|---|
| $f_1 = -59.942$ | $r_1=42.02$ | $d_1=1.5$ | $n_1=1.7495$ | $\nu_1=35.0$ |
| | $r_2=32.714$ | $d_2=6.2$ | | |
| | $r_3=516.061$ | $d_3=4.0$ | $n_2=1.5168$ | $\nu_2=64.2$ |
| | $r_4=-104.844$ | $d_4=0.1$ | | |
| | $r_5=-691.504$ | $d_5=2.0$ | $n_3=1.72$ | $\nu_3=50.3$ |
| | $r_6=26.197$ | $d_6=9.2$ | | |
| | $r_7=32.915$ | $d_7=3.9$ | $n_4=1.76182$ | $\nu_4=26.5$ |
| | $r_8=52.686$ | $d_8=33.217-14.474-0.420$ | | |
| $f_2=41.379$ | $r_9=39.486$ | $d_9=8.0$ | $n_5=1.62041$ | $\nu_5=60.3$ |
| | $r_{10}=-175.144$ | $d_{10}=2.5$ | | |
| | $r_{11}=20.425$ | $d_{11}=5.6$ | $n_6=1.62041$ | $\nu_6=60.3$ |
| | $r_{12}=55.862$ | $d_{12}=3.1$ | | |
| | $r_{13}=-137.5$ | $d_{13}=2.5$ | $n_7=1.80518$ | $\nu_7=25.5$ |
| | $r_{14}=19.771$ | $d_{14}=2.85$ | | |
| | $r_{15}=-263.447$ | $d_{15}=3.45$ | $n_8=1.62588$ | $\nu_8=35.6$ |
| | $r_{16}=-30.679$ | $d_{16}=0.1$ | | |
| | $r_{17}=37.263$ | $d_{17}=2.55$ | $n_9=1.62588$ | $\nu_9=35.6$ |
| | $r_{18}=60.913$ | | | |

EXAMPLE 8

Total focal length: 25.50-35.150-48.805
F-number: 4
Maximum angle of view: 80.6°
Back focal distance: 39.612-48.348-60.709

In order from the object side, $r_1$, $r_2$, $r_3$, . . . represent the curvature radii of the refracting surfaces of the lenses, $d_1$, $d_2$, $d_3$, . . . represent the center thickness of the lenses and the air spaces therebetween, and $n_1$, $n_2$,

| | | | | |
|---|---|---|---|---|
| $f_1 = -45.37879$ | $r_1=80.0$ | $d_1=3.5$ | $n_1=1.77279$ | $\nu_1=49.4$ |
| | $r_2=32.471$ | $d_2=10.0$ | | |
| | $r_3=-630.0$ | $d_3=5.0$ | $n_2=1.60342$ | $\nu_2=38.0$ |
| | $r_4=-70.3$ | $d_4=0.1$ | | |
| | $r_5=-217.401$ | $d_5=3.3$ | $n_3=1.80279$ | $\nu_3=46.8$ |
| | $r_6=38.907$ | $d_6=18.9$ | | |
| | $r_7=57.924$ | $d_7=3.6$ | $n_4=1.80518$ | $\nu_4=25.5$ |
| | $r_8=106.702$ | $d_8=35.412-15.342-0.503$ | | |
| $f_2 = 41.082$ | $r_9=56.8$ | $d_9=2.9$ | $n_5=1.53172$ | $\nu_5=48.9$ |
| | $r_{10}=-86.7$ | $d_{10}=1.2$ | $n_6=1.80518$ | $\nu_6=25.5$ |
| | $r_{11}=219.5$ | $d_{11}=0.1$ | | |
| | $r_{12}=31.648$ | $d_{12}=4.0$ | $n_7=1.50137$ | $\nu_7=56.5$ |
| | $r_{13}=201.0$ | $d_{13}=0.1$ | | |
| | $r_{14}=21.636$ | $d_{14}=6.8$ | $n_8=1.50137$ | $\nu_8=56.5$ |
| | $r_{15}=72.7$ | $d_{15}=3.8$ | | |
| | $r_{16}=-2100.0$ | $d_{16}=2.4$ | $n_9=1.79504$ | $\nu_9=28.4$ |
| | $r_{17}=16.739$ | $d_{17}=1.9$ | | |
| | $r_{18}=185.0$ | $d_{18}=3.8$ | $n_{10}=1.4645$ | $\nu_{10}=65.8$ |
| | $r_{19}=-57.432$ | $d_{19}=0.1$ | | |
| | $r_{20}=174.5$ | $d_{20}=2.3$ | $n_{11}=1.50137$ | $\nu_{11}=56.5$ |
| | $r_{21}=-58.829$ | | | |

In order from the object side, $r_1$, $r_2$, $r_3$, . . . represent the curvature radii of the refracting surfaces of the lenses, $d_1$, $d_2$, $d_3$, . . . represent the center thickness of the lenses and the air spaces therebetween, and $n_1$, $n_2$, $n_3$, . . . and $\nu_1$, $\nu_2$, $\nu_3$, . . . represent the refractive indices and Abbe numbers of the lenses.

Figure 9:
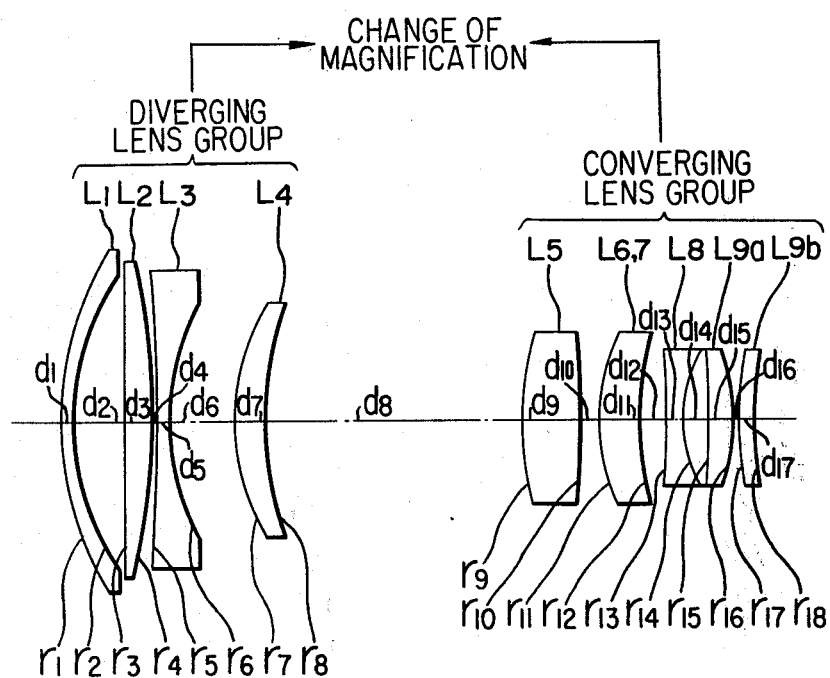

Example 9 is a modification of the basic form of Example 4, in which the sixth member or the positive lens component and the seventh member or the positive meniscus lens component which is convex to the object side are coupled to a single positive meniscus lens component which is convex to the object side, to provide the converging lens group by five components, thereby providing compactness of the entire lens system. Numerical data of this Example will be shown below, and the lens arrangement of this Example during the shortest focal length condition is shown in FIG. 9, while the aberrations in this Example are illustrated in FIG. 18.

EXAMPLE 9

Total focal length: 36.023-49.497-68.795
F-number: 3.5

$n_3$, . . . and $\nu_1$, $\nu_2$, $\nu_3$, . . . represent the refractive indices and Abbe numbers of the lenses.

What is claimed is:

1. A wide angle zoom lens system which comprises a diverging lens group and a converging lens group in order from the object side and in which both of said groups are movable on the optical axis of the lens system to vary the air space between said two groups so that the magnification of the image is variable while the image plane is being maintained at a fixed position.

said diverging lens group comprises, in order from the object side, a first member which is a negative meniscus lens component convex to the object side, a second member which is a positive lens component, a third member which is a negative lens component, a fourth member which is a positive meniscus lens component convex to the object side, said four lens components being separate from one another, and an air chamber having a converging effect between said second and said third members, said third and said fourth members being so disposed that the air space therebetween is greater than the center thickness of said third member. said converging lens group comprising at least four positive lens components and a negative lens component, the foremost and the rearmost lens components of said converging lens group being positive lens components.

2. A wide angle zoom lens system according to claim 1, wherein the shape of said negative lens component forming said third member and the air space between said third member and said positive meniscus lens component forming said fourth member satisfy the following conditions:

$$0.5 < (R_5 + R_6)/(R_5 - R_6) < 1.2 \text{ and}$$

$$0.1 \leq D/|f_1| \leq 0.4,$$

where $R_5$ and $R_6$ respectively represent the curvature radii of the surfaces of said third member facing the object side and the image side, respectively, and $f_1$ represents the total focal length of said diverging lens group.

3. A wide angle zoom lens system according to claim 2, wherein the respective lens components in said diverging lens group satisfy the following conditions:

$$1.2 < |f_{11}|/|f_1| < 3.8,$$

$$1.8 < f_{12}/|f_1| < 4.0,$$

$$0.4 < |f_{13}|/|f_1| < 1.2 \text{ and}$$

$$1.2 < f_{14}/|f_1| < 3.8,$$

where $f_1$ represents the total focal length of said diverging lens group, $f_{1i}$ the focal length of each individual lens component in said diverging group, and the suffix i the order from the object side.

4. A wide angle zoom lens system according to claim 3, wherein the respective lens components in said diverging lens group further satisfy the following conditions:

$$1.3 < Q_{11} < 8.2,$$

$$0.5 < Q_{12} < 1.5 \text{ and}$$

$$-5.1 < Q_{14} < -1.5,$$

where $Q_{1i}$ represents the shape factor of each lens component in said diverging lens group, and the shape factor is defined as $(r_F + r_R)/(r_F - r_R)$, where $r_F$ and $r_R$ represent the curvature radii of the foremost and the rearmost surface of each lens component.

5. A wide angle zoom lens system according to claim 4, wherein the lens components of said converging lens group, in order from the object side, are a positive lens, a positive lens, a positive meniscus lens convex to the object side, a negative lens, and a positive lens.

6. A wide angle zoom lens system according to claim 5, wherein the respective lens components in said converging lens group satisfy the following conditions:

$$2.8 < f_{21}/f_2 < 4.5,$$

$$1.0 < f_{22}/f_2 < 1.8,$$

$$1.1 < f_{23}/f_2 < 2.0,$$

$$0.4 < |f_{24}|/f_2 < 0.6 \text{ and}$$

$$0.9 < f_{25}/f_2 < 1.1,$$

where $f_2$ represents the total focal length of said converging lens group, $f_{2i}$ the focal length of each lens component in said converging lens group, and the suffix i the order from the object side.

7. A wide angle zoom lens system according to claim 6, wherein the respective lens components in said converging lens group further satisfy the following conditions:

$$-0.9 < Q_{21} < -0.1,$$

$$-1.0 < Q_{22} < -0.7,$$

$$-3.4 < Q_{23} < -1.5,$$

$$0.8 < Q_{24} < 1.4 \text{ and}$$

$$-0.2 < Q_{25} < 0.4,$$

where $Q_{2i}$ represents the shape factor of each lens component in said diverging lens group and the suffix i represents the order from the object side, the shape factor being defined as $(r_F + r_R)/(r_F - r_R)$, where $r_F$ and $r_R$ represents the curvature radii of the foremost and the rearmost surface, respectively, of each lens component.

8. A wide angle zoom lens system according to claim 7, wherein, in said diverging lens group, the divergent components, namely, said negative lens component forming said first member and said negative lens component forming said third member have Abbe numbers greater than those of the convergent components, namely, said positive lens component forming said second member and said positive meniscus lens component forming said fourth member.

9. A wide angle zoom lens system according to claim 7, having the following numerical data:
Total focal length: 36.023 - 49.497 - 68.795
F-number: 3.5
Maximum angle of view: 62°
Back focal distance: 43.776 - 53.991 - 68.622

| | $r_1 = 50.379$ | $d_1 = 1.3$ | $n_1 = 1.74443$ | $\nu_1 = 49.4$ |
|---|---|---|---|---|
| | $r_2 = 27.469$ | $d_2 = 6.3$ | | |
| $f_1 =$ | $r_3 = 670.373$ | $d_3 = 3.5$ | $n_2 = 1.5168$ | $\nu_2 = 64.2$ |
| $-53.0$ | $r_4 = -114.009$ | $d_4 = 0.1$ | | |
| | $r_5 = \infty$ | $d_5 = 1.8$ | $n_3 = 1.713$ | $\nu_3 = 53.9$ |
| | $r_6 = 32.531$ | $d_6 = 8.4$ | | |
| | $r_7 = 35.195$ | $d_7 = 3.4$ | $n_4 = 1.76182$ | $\nu_4 = 26.5$ |
| | $r_8 = 57.719$ | $d_8 = 29.009 - 12.916 - 0.846$ | | |

$$f_2 = 40.182 \begin{cases} r_9 = 101.102 & d_9 = 3.0 & n_5 = 1.5168 & \nu_5 = 64.2 \\ r_{10} = -763.611 & d_{10} = 0.1 \\ r_{11} = 28.387 & d_{11} = 6.4 & n_6 = 1.52 & \nu_6 = 70.1 \\ r_{12} = -449.780 & d_{12} = 0.1 \\ r_{13} = 19.335 & d_{13} = 5.9 & n_7 = 1.52 & \nu_7 = 70.1 \\ r_{14} = 37.463 & d_{14} = 4.0 \\ r_{15} = -564.061 & d_{15} = 1.4 & n_8 = 1.80518 & \nu_8 = 25.5 \\ r_{16} = 16.279 & d_{16} = 3.85 \\ r_{17} = 44.719 & d_{17} = 4.1 & n_9 = 1.6727 & \nu_9 = 32.2 \\ r_{18} = -56.902 \end{cases}$$

where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

10. A wide angle zoom lens system according to claim 7, having the following numerical data:
Total focal length: 36.023-49.497-68.796
F-number: 3.5
Maximum angle of view: 62°
Back focal distance: 43.491-52.793-66.114

$$f_1 = -59.942 \begin{cases} r_1 = 52.287 & d_1 = 1.5 & n_1 = 1.72342 & \nu_1 = 38.0 \\ r_2 = 35.517 & d_2 = 4.9 \\ r_3 = \infty & d_3 = 4.0 & n_2 = 1.5168 & \nu_2 = 64.2 \\ r_4 = -98.799 & d_4 = 0.1 \\ r_5 = -879.752 & d_5 = 2.0 & n_3 = 1.72 & \nu_3 = 50.3 \\ r_6 = 27.242 & d_6 = 8.5 \\ r_7 = 34.469 & d_7 = 3.9 & n_4 = 1.76182 & \nu_4 = 26.5 \end{cases}$$

$$f_2 = 41.379 \begin{cases} r_8 = 61.405 & d_8 = 33.625 - 14.882 - 0.825 \\ r_9 = 117.209 & d_9 = 3.5 & n_5 = 1.62299 & \nu_5 = 58.1 \\ r_{10} = -98.386 & d_{10} = 1.0 & n_6 = 1.80518 & \nu_6 = 25.5 \\ r_{11} = -323.279 & d_{11} = 0.1 \\ r_{12} = 28.810 & d_{12} = 5.75 & n_7 = 1.51118 & \nu_7 = 50.9 \\ r_{13} = 516.415 & d_{13} = 0.1 \\ r_{14} = 19.119 & d_{14} = 5.2 & n_8 = 1.51118 & \nu_8 = 50.9 \\ r_{15} = 39.311 & d_{15} = 2.9 \\ r_{16} = \infty & d_{16} = 2.5 & n_9 = 1.80518 & \nu_9 = 25.5 \\ r_{17} = 16.622 & d_{17} = 4.0 \\ r_{18} = 50.614 & d_{18} = 3.8 & n_{10} = 1.61293 & \nu_{10} = 36.9 \\ r_{19} = -48.431 \end{cases}$$

where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

11. A wide angle zoom lens system according to claim 8, having the following numerical data:
Total focal length: 25.50-35.150-48.805
F-number: 4

Maximum angle of view: 80.6°
Back focal distance: 40.102-48.838-61.200

$$f_1 = -45.379 \begin{cases} r_1 = 80.0 & d_1 = 3.5 & n_1 = 1.77279 & \nu_1 = 49.4 \\ r_2 = 32.471 & d_2 = 10.0 \\ r_3 = -1000.0 & d_3 = 5.0 & n_2 = 1.60342 & \nu_2 = 38.0 \\ r_4 = -68.877 & d_4 = 0.1 \\ r_5 = -429.670 & d_5 = 3.3 & n_3 = 1.80279 & \nu_3 = 46.8 \\ r_6 = 30.696 & d_6 = 12.9 \\ r_7 = 42.617 & d_7 = 3.6 & n_4 = 1.71736 & \nu_4 = 29.5 \\ r_8 = 93.788 & d_8 = 38.834 - 18.764 - 3.925 \end{cases}$$

$$f_2 = 41.082 \begin{cases} r_9 = 109.554 & d_9 = 4.2 & n_5 = 1.53172 & \nu_5 = 48.9 \\ r_{10} = -184.418 & d_{10} = 0.1 \\ r_{11} = 37.007 & d_{11} = 5.1 & n_6 = 1.50137 & \nu_6 = 56.5 \\ r_{12} = -459.818 & d_{12} = 0.1 \\ r_{13} = 21.134 & d_{13} = 7.6 & n_7 = 1.50137 & \nu_7 = 56.5 \\ r_{14} = 73.546 & d_{14} = 3.5 \\ r_{15} = -154.35 & d_{15} = 2.4 & n_8 = 1.79504 & \nu_8 = 28.4 \\ r_{16} = 17.663 & d_{16} = 3.54 \\ r_{17} = 53.968 & d_{17} = 3.8 & n_9 = 1.46450 & \nu_9 = 65.8 \\ r_{18} = -27.275 \end{cases}$$

where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots \nu_1, \nu_2, \nu_3, \ldots$ represent the refractive indices and Abbe number of the lenses.

12. A wide angle zoom lens system according to claim 4, wherein said converging lens group includes six components, namely, in order from the object side, a fifth member which is a positive lens component, a sixth member which is a positive lens component, a seventh member which is a positive meniscus lens component convex to the object side, an eighth member which is a negative lens component, a ninth member which is a positive lens component, and a tenth member which is a positive lens component.

13. A wide angle zoom lens system according to claim 12, wherein the respective lens components in said converging lens group satisfy the following conditions:

$1.9 < f_{21}/f_2 < 3.5,$ $1.1 < f_{22}/f_2 < 1.9,$ $1.1 < f_{23}/f_2 < 3.5,$ $0.4 < |f_{24}|/f_2 < 0.6,$ $1.0 < f_{25}/f_2 < 3.5$ and $1.2 < f_{26}/f_2 < 4.0,$ where $f_2$ represents the total focal length of said converging lens group, $f_{2i}$ the focal length of each lens component in said converging lens group, and the suffix i the order from the object side.

14. A wide angle zoom lens system according to claim 13, wherein the respective lens components in said converging lens group satisfy the following conditions:

$-1.3 < Q_{21} < -0.5,$ $-1.5 < Q_{22} < -0.9,$ $-6.2 < Q_{23} < -1.3,$ $0.4 < Q_{24} < 1.2,$ $0.4 < Q_{25} < 1.5$ and $-1.0 < Q_{26} < 1.3,$ where $Q_{2i}$ represents the shape factor of each lens component in said diverging lens group and the suffix i represents the order from the object side, the shape factor being defined as $(r_F + r_R)$, where $r_F$ and $r_R$ represents the curvature radii of the foremost and rearmost surfaces of each lens components.

15. A wide angle zoom lens system according to claim 14, wherein, in said diverging lens group, the divergent components, namely, said negative meniscus lens component forming said first member and said negative lens component forming said third member have Abbe numbers greater than those of the convergent components, namely, said positive lens component forming said second member and said positive meniscus lens component forming said fourth member.

16. A wide angle zoom lens system according to claim 14, having the following numerical data:
Total focal length: 25-35.355-47.625
F-number: 4
Maximum angle of view: 81.6°
Back focal distance: 37.831-46.655-57.134

$f_1 = -40.0$
$\begin{cases} r_1 = 160. & d_1 = 3.2 & n_1 = 1.713 & \nu_1 = 53.9 \\ r_2 = 33.8 & d_2 = 6.5 \\ r_3 = 365.63 & d_3 = 4.7 & n_2 = 1.5168 & \nu_2 = 64.2 \\ r_4 = -62.5 & d_4 = 0.1 \\ r_5 = 430.791 & d_5 = 2.0 & n_3 = 1.74 & \nu_3 = 28.2 \\ r_6 = -500. & d_6 = 0.7 & n_4 = 1.713 & \nu_4 = 53.9 \\ r_7 = 23.05 & d_7 = 10.5 \\ r_8 = 30.503 & d_8 = 2.8 & n_5 = 1.80518 & \nu_5 = 25.5 \\ r_9 = 46.128 & d_9 = 26.364 & -10.390-0.439 \end{cases}$ $f_2 = 34.087$
$\begin{cases} r_{10} = 49. & d_{10} = 1.9 & n_6 = 1.52 & \nu_6 = 70.1 \\ r_{11} = 573.031 & d_{11} = 0.1 \\ r_{12} = 26.375 & d_{12} = 6.3 & n_7 = 1.52 & \nu_7 = 70.1 \\ r_{13} = 220. & d_{13} = 0.1 \\ r_{14} = 18.845 & d_{14} = 3.5 & n_8 = 1.52 & \nu_8 = 70.1 \\ r_{15} = 89.339 & d_{15} = 3.1 \\ r_{16} = -94.098 & d_{16} = 1.43 & n_9 = 1.71736 & \nu_9 = 29.5 \\ r_{17} = 15.751 & d_{17} = 2.1 \\ r_{18} = -400. & d_{18} = 2.0 & n_{10} = 1.62041 & \nu_{10} = 60.3 \\ r_{19} = -52.854 & d_{19} = 0.1 \\ r_{20} = -557.09 & d_{20} = 2.0 & n_{11} = 1.62374 & \nu_{11} = 47.0 \\ r_{21} = -35.592 \end{cases}$ where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

17. A wide angle zoom lens system according to claim 14, having the following numerical data:
Total focal length: 25.041-34.500-44.533
F-number: 4
Maximum angle of view: 81.6°
Back focal distance: 38.002-46.370-55.244

$f_1 = -43.706$
$\begin{cases} r_1 = 107. & d_1 = 2.0 & n_1 = 1.74443 & \nu_1 = 49.4 \\ r_2 = 32.9 & d_2 = 9.0 \\ r_3 = \infty & d_3 = 5.1 & n_2 = 1.5168 & \nu_2 = 64.2 \\ r_4 = -71.174 & d_4 = 0.1 \\ r_5 = 1000. & d_5 = 2.2 & n_3 = 1.80518 & \nu_3 = 25.5 \\ r_6 - 200. & d_6 = 0.8 & n_4 = 1.76684 & \nu_4 = 46.6 \\ r_7 = 31. & d_7 = 15.1 \\ r_8 = 42.614 & d_8 = 2.4 & n_5 = 1.80518 & \nu_5 = 25.5 \\ r_9 = 68.786 & d_9 = 29.957 & -11.454-0.421 \end{cases}$ $f_2 = 38.662$
$\begin{cases} r_{10} = 51.375 & d_{10} = 4.0 & n_6 = 1.50137 & \nu_6 = 56.5 \\ r_{11} = -158. & d_{11} = 1.5 & n_7 = 1.74 & \nu_7 = 28.2 \\ r_{12} = -200. & d_{12} = 0.1 \\ r_{13} = 24.778 & d_{13} = 4.8 & n_8 = 1.50137 & \nu_8 = 56.5 \\ r_{14} = 671.508 & d_{14} = 0.1 \\ r_{15} = 24.7 & d_{15} = 4.7 & n_9 = 1.50137 & \nu_9 = 56.5 \\ r_{16} = 117.445 & d_{16} = 3.6 \\ r_{17} = -67.089 & d_{17} = 2.3 & n_{10} = 1.80518 & \nu_{10} = 25.5 \\ r_{18} = 18. & d_{18} = 2.4 \\ r_{19} = -40.755 & d_{19} = 0.8 & n_{11} = 1.61025 & \nu_{11} = 56.5 \\ r_{20} = -500. & d_{20} = 2.7 & n_{12} = 1.50137 & \nu_{12} = 56.5 \\ r_{21} = -23. & d_{21} = 0.1 \\ r_{22} = 173.125 & d_{22} = 2.0 & n_{13} = 1.56732 & \nu_{13} = 42.8 \\ r_{23} = -43.441 \end{cases}$ where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

18. A wide angle zoom lens system according to claim 14, having the following numerical data:
Total focal length: 25.00-34.461-47.766
F-number: 4
Maximum angle of view: 81.6°
Back focal distance: 38.828-47.392-59.437

$f_1 = -44.489$
$\begin{cases} r_1 = 74.96 & d_1 = 3.7 & n_1 = 1.76684 & \nu_1 = 46.6 \\ r_2 = 31.585 & d_2 = 9.3 \\ r_3 = -1100.000 & d_3 = 4.8 & n_2 = 1.50137 & \nu_2 = 56.5 \\ r_4 = -67.23 & d_4 = 0.1 \\ r_5 = -190.332 & d_5 = 2.1 & n_3 = 1.80985 & \nu_3 = 22.9 \\ r_6 = -89.000 & d_6 = 1.0 & n_4 = 1.76684 & \nu_4 = 46.6 \\ r_7 = 36.661 & d_7 = 18.5 \\ r_8 = 56.600 & d_8 = 3.5 & n_5 = 1.74 & \nu_5 = 28.2 \\ r_9 = 113.765 & d_9 = 35.020 - 15.341 - 0.861 \end{cases}$ -continued $$f_2 = 40.276 \begin{cases} r_{10}=56.000 & \text{l0}=3.5 & n_6=1.53172 & \nu_6=48.9 \\ r_{11}=-121.000 & d_{11}=1.5 & n_7=1.80518 & \nu_7=25.5 \\ r_{12}=-275.395 & d_{12}=0.1 \\ r_{13}=31.2 & d_{13}=3.9 & n_8=1.50137 & \nu_8=56.5 \\ r_{14}=220.000 \\ r_{15}=21.365 & d_{15}=6.7 & n_9=1.50137 & \nu_9=56.5 \\ r_{16}=79.163 & d_{16}=3.75 \\ r_{17}=-554. & d_{17}=2.4 & n_{10}=1.80518 & \nu_{10}=25.5 \\ r_{18}=16.7 & d_{18}=1.9 \\ r_{19}=350. & d_{19}=1.1 & n_{11}=1.6968 & \nu_{11}=55.6 \\ r_{20}=87.133 & d_{20}=2.5 & n_{12}=1.50137 & \nu_{12}=56.5 \\ r_{21}=-54.953 & d_{21}=0.1 \\ r_{22}=167.188 & d_{22}=2.1 & n_{13}=1.59551 & \nu_{13}=39.2 \\ r_{23}=-62.039 \end{cases}$$

where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

20. A wide angle zoom lens system according to claim 15, having the following numerical data:
Total focal length: 25.50-35.150-48.805
F-number: 4
Maximum angle of view: 80.6°
Back focal distance: 39.612-48.348-60.709

$$f_1 = -45.37879 \begin{cases} r_1=80.0 & d_1=3.5 & n_1=1.77279 & \nu_1=49.4 \\ r_2=32.471 & d_2=10.0 \\ r_3=-630.0 & d_3=5.0 & n_2=1.60342 & \nu_2=38.0 \\ r_4=-70.3 & d_4=0.1 \\ r_5=-217.401 & d_5=3.3 & n_3=1.80279 & \nu_3=46.8 \\ r_6=38.907 & d_6=18.9 \\ r_7=57.924 & d_7=3.6 & n_4=1.80518 & \nu_4=25.5 \\ r_8=106.702 & d_8=35.412-15.342-0.503 \end{cases}$$

$$f_2 = 41.082 \begin{cases} r_9=56.8 & d_9=2.9 & n_5=1.53172 & \nu_5=48.9 \\ r_{10}=-86.7 & d_{10}=1.2 & n_6=1.80518 & \nu_6=25.5 \\ r_{11}=-219.5 & d_{11}=0.1 \\ r_{12}=31.648 & d_{12}=4.0 & n_7=1.50137 & \nu_7=56.5 \\ r_{13}=201.0 & d_{13}=0.1 \\ r_{14}=21.636 & d_{14}=6.8 & n_8=1.50137 & \nu_8=56.5 \\ r_{15}=72.7 & d_{15}=3.8 \\ r_{16}=-2100.0 & d_{16}=2.4 & n_9=1.79504 & \nu_9=28.4 \\ r_{17}=16.739 & d_{17}=1.9 \\ r_{18}=185.0 & d_{18}=3.8 & n_{10}=1.4645 & \nu_{10}=65.8 \\ r_{19}=-57.432 & d_{19}=0.1 \\ r_{20}=174.5 & d_{20}=2.3 & n_{11}=1.50137 & \nu_{11}=56.5 \\ r_{21}=-58.829 \end{cases}$$

where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

19. A wide angle zoom lens system according to claim 15, having the following numerical data:
Total focal length: 28.647-39.469-54.512
F-number: 3.5
Maximum angle of view: 74°
Back focal distance: 40.724-49.439-61.556

21. A wide angle zoom lens system according to claim 4, wherein the lens components of said converging lens group, in order from the object side, are a positive lens, a positive meniscus lens convex to the object side, a negative lens, a positive lens, and a positive lens component.

22. A wide angle zoom lens system according to claim 21, having the following numerical data:
Total focal length: 36.023-49.497-68.795
F-number: 3.5

$$f_1 = \begin{cases} r_1=72.6 & d_1=3.8 & n_1=1.76684 & \nu_1=16.6 \\ r_2=30.519 & d_2=9.4 \\ r_3=3000.0 & d_3=5.2 & n_2=1.56732 & \nu_2=12.8 \\ R_4=-60.5 & d_4=0.1 \\ r_5=-118.686 & d_5=4.3 & n_3=1.76684 & \nu_3=46.6 \\ r_6=31.5 & d_6=6.4 \\ r_7=38.34 & d_7=3.5 & n_4=1.71736 & \nu_4=29.5 \\ r_8=137.056 & d_8=36.742-17.469-3.389 \end{cases}$$

$$f_2 = 40.273 \begin{cases} r_9=48.95 & d_9=5.5 & 5=1.52 & \nu_5=70.1 \\ r_{10}=2251.239 & d_{10}=0.1 \\ r_{11}=25.58 & d_{11}=5.2 & n_6=1.5168 & \nu_6=64.2 \\ r_{12}=576.194 & d_{12}=0.1 \\ r_{13}=28.261 & d_{13}=5.0 & n_7=1.6172 & \nu_7=54.0 \\ r_{14}=39.896 & d_{14}=3.7 \\ R_{15}=-71.6 & d_{15}=2.1 & 8=1.74 & \nu_8=28.2 \\ r_{16}=20.344 & d_{16}=2.5 \\ r_{17}=170.7 & d_{17}=3.7 & n_9=1.5725 & \nu_9=57.5 \\ r_{18}=-32.0 & d_{18}=0.1 \\ r_{19}=97.717 & d_{19}=2.3 & n_{10}=1.62606 & \nu_{10}=39.1 \\ r_{20}=-1452.182 \end{cases}$$

Maximum angle of view: 62°
Back focal distance: 43.570-52.871-66.193

$f_1 = -59.952$
| | | |
|---|---|---|
| $r_1 = 42.02$ | $d_1 = 1.5$ | $n_1 = 1.7495$ $\nu_1 = 35.0$ |
| $r_2 = 32.714$ | $d_2 = 6.2$ | |
| $r_3 = 516.061$ | $d_3 = 4.0$ | $n_2 = 1.5168$ $\nu_2 = 64.2$ |
| $r_4 = -104.844$ | $d_4 = 0.1$ | |
| $r_5 = -691.504$ | $d_5 = 2.0$ | $n_3 = 1.72$ $\nu_3 = 50.3$ |
| $r_6 = 26.197$ | $d_6 = 9.2$ | |
| $r_7 = 32.915$ | $d_7 = 3.9$ | $n_4 = 1.76182$ $\nu_4 = 26.5$ |
| $r_8 = 52.686$ | $d_8 = 33.217 - 14.474 - 0.420$ | |

$f_2 = 41.379$
| | | |
|---|---|---|
| $r_9 = 39.486$ | $d_9 = 8.0$ | $n_5 = 1.62041$ $\nu_5 = 60.3$ |
| $r_{10} = -175.144$ | $d_{10} = 2.5$ | |
| $r_{11} = 20.425$ | $d_{11} = 5.6$ | $n_6 = 1.62041$ $\nu_6 = 60.3$ |
| $r_{12} = 55.862$ | $d_{12} = 3.1$ | |
| $r_{13} = -137.5$ | $d_{13} = 2.5$ | $n_7 = 1.80518$ $\nu_7 = 25.5$ |
| $r_{14} = 19.771$ | $d_{14} = 2.85$ | |
| $r_{15} = -263.447$ | $d_{15} = 3.45$ | $n_8 = 1.62588$ $\nu_8 = 35.6$ |
| $r_{16} = -30.679$ | $d_{16} = 0.1$ | |
| $r_{17} = 37.263$ | $d_{17} = 2.55$ | $n_9 = 1.62588$ $\nu_9 = 35.6$ |
| $r_{18} = 60.913$ | | | where $r_1, r_2, r_3, \ldots$ represent the curvature radii of the refracting surfaces of the lenses, $d_1, d_2, d_3, \ldots$ represent the center thickness of the lenses and the air spaces therebetween, and $n_1, n_2, n_3, \ldots$ and $\nu_1, \nu_2, \nu_3, \ldots$ represent the refractive indices and Abbe numbers of the lenses.

* * * * *